(12) United States Patent
Mielke et al.

(10) Patent No.: US 6,770,331 B1
(45) Date of Patent: Aug. 3, 2004

(54) COLORANT PREPARATIONS

(75) Inventors: Manfred Mielke, Heidelberg (DE);
Friedrich-Wilhelm Raulfs, Mannheim (DE); Ulrike Schlösser, Neustadt (DE);
Rüdiger Sens, Ludwigshafen (DE);
Karl Siemensmeyer, Frankenthal (DE);
Dieter Freyberg, Einselthum (DE);
Mike Freche, Kerzenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 128 days.

(21) Appl. No.: 10/049,503

(22) PCT Filed: Aug. 3, 2000

(86) PCT No.: PCT/EP00/07500

§ 371 (c)(1),
(2), (4) Date: Feb. 13, 2002

(87) PCT Pub. No.: WO01/12728

PCT Pub. Date: Feb. 22, 2001

(30) Foreign Application Priority Data

Aug. 13, 1999 (DE) .......................................... 199 38 471
May 27, 2000 (DE) .......................................... 100 26 465

(51) Int. Cl.⁷ .......................... C09D 11/02; C08F 2/48
(52) U.S. Cl. ....................... 427/496; 427/508; 427/521; 427/256; 427/372.2; 156/277; 347/100; 106/31.86; 106/31.87; 106/31.9; 106/503
(58) Field of Search .......................... 156/277; 427/496, 427/508, 521, 256, 372.2; 347/100; 100/31.86, 31.87, 31.9, 503

(56) References Cited

U.S. PATENT DOCUMENTS

| | | | |
|---|---|---|---|
| 3,193,575 A | 7/1965 | Nebel et al. | |
| 4,218,218 A | 8/1980 | Daubach et al. | |
| 5,186,846 A | 2/1993 | Brueckmann et al. | |
| 5,534,166 A | 7/1996 | Brueckmann et al. | |
| 5,658,431 A | 8/1997 | Janson et al. | |
| 6,048,945 A | 4/2000 | Debzubger et al. | |
| 6,123,740 A | 9/2000 | Sens et al. | |
| 6,332,943 B1 * | 12/2001 | Herrmann et al. | .......... 156/277 |

FOREIGN PATENT DOCUMENTS

| | | |
|---|---|---|
| DE | 1137 005 | 4/1963 |
| DE | 1 619 656 | 3/1971 |
| DE | 36 41677 | 6/1988 |
| DE | 19515 943 | 11/1998 |
| DE | 198 01462 | 7/1999 |
| DE | 19842 952 | 3/2000 |
| EP | 380 778 | 8/1990 |
| GB | 1185861 | 3/1970 |
| WO | 97/46623 | 12/1997 |
| WO | 98/24850 | 6/1998 |
| WO | 99/01516 | 1/1999 |
| WO | 99/29783 | 6/1999 |

OTHER PUBLICATIONS

Derwent 99–106025/09.
Derwent 98–042148/04.
Derwent 1999–348290/30.
Ullmann'sEnc.Ind.Chem., vol. A1:107–113.
Derwent 2000–284282/25.
Ink Jet Printing for Textiles,Smith et al. 23–29;8/87.
Ink Jet Systems for Dyeing . . . Graham et al., 6/89,27–32.

* cited by examiner

Primary Examiner—Kriellion A. Sanders
(74) Attorney, Agent, or Firm—Keil & Weinkauf

(57) ABSTRACT

The invention relates to colorant preparations containing the following main constituents: A) at least one dispersed (A1) or dissolved (A2) colorant; B) if a colorant corresponding to (A1) is used, a dispersing agent; C) a low-molecular polytetrahydurofurane (C1), optionally mixed with one or more difficult-to-evaporate, water-soluble or water-miscible organic solvents (C2); and D) water.

11 Claims, No Drawings

COLORANT PREPARATIONS

The present invention relates to novel colorant preparations comprising

A) at least one dispersed (A1) or dissolved (A2) colorant,
B) a dispersant in the case of a colorant (A1),
C) a low molecular weight polytetrahydrofuran (C1), if desired in mixture with one or more high-boiling water-soluble or -miscible organic solvents (C2), and
D) water as essential constituents.

This invention further relates to the use of these colorant preparations as inks in the ink-jet process and to a process for printing sheetlike or three-dimensionally configured substrates by the ink-jet process using these colorant preparations.

Inks for use in the ink-jet process (such as Thermal Ink Jet, Piezo Ink Jet, Continuous Ink Jet, Valve Jet) have to meet a whole series of requirements. They have to have a viscosity and surface tension suitable for printing, they have to be stable in storage, i.e., they should not coagulate or flocculate, and they must not lead to cloggage of the printer nozzle, which can be problematical especially in the case of inks containing dispersed, i.e., undissolved, colorant particles. Stability in storage further requires of these inks that the dispersed colorant particles do not sediment. Finally, in the case of Continuous Ink Jet, the inks shall be stable to the addition of conducting salts and be free from any tendency to flock out with an increase in the ion content. In addition, the prints obtained have to meet colorists' requirements, i.e., show brilliance and depth of shade, and have good fastness properties, e.g., for example rubfastness, lightfastness, waterfastness and wetrubfastness, and good drying behavior.

WO-A-99/01516 discloses pigmented ink-jet inks which differ from the present colorant preparations because of component (C).

It is an object of the present invention to provide novel colorant preparations having advantageous application properties in the ink-jet process, including in particular good start-of-print and sustained use behavior with good drying behavior.

We have found that this object is achieved by the colorant preparations defined at the beginning.

Colorant preparations according to the invention may include essentially insoluble dispersed colorant (A1) (finely divided organic or inorganic pigments or dyes which are insoluble in the water/solvent mixture) or dissolved colorant (A2) (dyes which are soluble in the water/solvent mixture). Colorant preparations according to the invention may also include colorant mixtures, but preferably only one colorant is present. Pigment-based colorant preparations according to the invention are preferred. By way of brightening agents, these pigment preparations may include dyes, especially direct, acid or reactive dyes, that are similar in hue to the pigment.

There now follow examples of useful pigments (A1), vat dyes being included among the organic pigments on account of the overlap with organic pigments.

Organic Pigments:

monoazo pigments: C.I. Pigment Brown 25;
C.I. Pigment Orange 5, 13, 36 and 67;
C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251;
C.I. Pigment Yellow 1, 3, 73, 74, 65, 97, 151 and 183;
disazo pigments: C.I. Pigment Orange 16, 34 and 44;
C.I. Pigment Red 144, 166, 214 and 242;
C.I. Pigment Yellow 12, 13, 14, 16, 17, 81, 83, 106, 113, 126, 127, 155, 174, 176 and 188;
anthanthrone pigments: C.I. Pigment Red 168 (C.I. Vat Orange 3);
anthraquinone pigments: C.I. Pigment Yellow 147 and 177;
C.I. Pigment Violet 31;
anthrapyrimidine pigments: C.I. Pigment Yellow 108 (C.I. Vat Yellow 20);
quinacridone pigments: C.I. Pigment Red 122, 202 and 206;
C.I. Pigment Violet 19;
quinophthalone pigments: C.I. Pigment Yellow 138;
dioxazine pigments: C.I. Pigment Violet 23 and 37;
flavanthrone pigments: C.I. Pigment Yellow 24 (C.I. Vat Yellow 1);
indanthrone pigments: C.I. Pigment Blue 60 (C.I. Vat Blue 4) and 64 (C.I. Vat Blue 6);
isoindoline pigments: C.I. Pigment Orange 69;
C.I. Pigment Red 260;
C.I. Pigment Yellow 139 and 185;
isoindolinone pigments: C.I. Pigment Orange 61;
C.I. Pigment Red 257 and 260;
C.I. Pigment Yellow 109, 110, 173 and 185;
isoviolanthrone pigments: C.I. Pigment Violet 31 (C.I. Vat Violet 1);
metal complex pigments: C.I. Pigment Yellow 117, 150 and 153;
C.I. Pigment Green 8;
perinone pigments: C.I. Pigment Orange 43 (C.I. Vat Orange 7);
C.I. Pigment Red 194 (C.I. Vat Red 15);
perylene pigments: C.I. Pigment Black 31 and 32;
C.I. Pigment Red 123, 149, 178, 179 (C.I. Vat Red 23), 190 (C.I. Vat Red 29) and 224;
C.I. Pigment Violet 29;
phthalocyanine pigments: C.I. Pigment Blue 15, 15:1, 15:2, 15:3, 15:4, 15:6 and 16;
C.I. Pigment Green 7 and 36;
pyranthrone pigments: C.I. Pigment Orange 51;
C.I. Pigment Red 216 (C.I. Vat Orange 4);
thioindigo pigments: C.I. Pigment Red 88 and 181 (C.I. Vat Red 1);
C.I. Pigment Violet 38 (C.I. Vat Violet 3);
triarylcarbonium pigments: C.I. Pigment Blue 1, 61 and 62;
C.I. Pigment Green 1;
C.I. Pigment Red 81, 81:1 and 169;
C.I. Pigment Violet 1, 2, 3 and 27;
C.I. Pigment Black 1 (aniline black);
C.I. Pigment Yellow 101 (aldazine yellow);
C.I. Pigment Brown 22;
vat dyes (in addition to those already mentioned above):
C.I. Vat Yellow 2, 3, 4, 5, 9, 10, 12, 22, 26, 33, 37, 46, 48, 49 and 50;
C.I. Vat Orange 1, 2, 5, 9, 11, 13, 15, 19, 26, 29, 30 and 31;
C.I. Vat Red 2, 10, 12, 13, 14, 16, 19, 21, 31, 32, 37, 41, 51, 52 and 61;
C.I. Vat Violet 2, 9, 13, 14, 15, 17 and 21;
C.I. Vat Blue 1 (C.I. Pigment Blue 66), 3, 5, 10, 12, 13, 14, 16, 17, 18, 19, 20, 22, 25, 26, 29, 30, 31, 35, 41, 42, 43, 64, 65, 66, 72 and 74;

C.I. Vat Green 1, 2, 3, 5, 7, 8, 9, 13, 14, 17, 26, 29, 30, 31, 32, 33, 40, 42, 43, 44 and 49;

C.I. Vat Brown 1, 3, 4, 5, 6, 9, 11, 17, 25, 32, 33, 35, 38, 39, 41, 42, 44, 45, 49, 50, 55, 57, 68, 72, 73, 30, 81, 82, 83 and 84;

C.I. Vat Black 1, 2, 7, 8, 9, 13, 14, 16, 19, 20, 22, 25, 27, 28, 29, 30, 31, 32, 34, 36, 56, 57, 58, 63, 64 and 65;

Inorganic Pigments:

white pigments: titanium dioxide (C.I. Pigment White 6), zinc white, pigment grade zinc oxide; zinc sulfide, lithopone; lead white;

black pigments: iron oxide black (C.I. Pigment Black 11), iron manganese black, spinel black (C.I. Pigment Black 27); carbon black (C.I. Pigment Black 7);

color pigments: chromium oxide, chromium oxide hydrate green; chrome green (C.I. Pigment Green 48); cobalt green (C.I. Pigment Green 50); ultramarine green;

cobalt blue (C.I. Pigment Blue 28 and 36); ultramarine blue; iron blue (C.I. Pigment Blue 27); manganese blue;

ultramarine violet; cobalt violet, manganese violet;

iron oxide red (C.I. Pigment Red 101); cadmium sulfoselenide (C.I. Pigment Red 108); molybdate red (C.I. Pigment Red 104); ultramarine red;

iron oxide brown, mixed brown, spinel and corundum phases (C.I. Pigment Brown 24, 29 and 31), chrome orange;

iron oxide yellow (C.I. Pigment-Yellow 42); nickel titanium yellow (C.I. Pigment Yellow 53; C.I. Pigment Yellow 157 and 164); chrome titanium yellow; cadmium sulfide and cadmium zinc sulfide (C.I. Pigment Yellow 37 and 35); chrome yellow (C.I. Pigment Yellow 34), zinc yellow, alkaline earth metal chromates; Naples yellow; bismuth vanadate (C.I. Pigment Yellow 184);

interference pigments: metallic effect pigments based on coated metal platelets; pearl luster pigments based on mica platelets coated with metal oxide; liquid crystal pigments.

Preferred pigments in this context are monoazo pigments (especially laked BONS pigments, naphthol AS pigments), disazo pigments (especially diaryl yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments and carbon blacks.

Examples of particularly preferred pigments are specifically: C.I. Pigment Yellow 138, C.I. Pigment Red 122, C.I. Pigment Violet 19, C.I. Pigment Blue 15:3 and 15:4, C.I. Pigment Black 7, C.I. Pigment Orange 5, 38 and 43 and C.I. Pigment Green 7.

These pigments are very useful for preparing ink-jet ink sets based on colorant preparations according to the invention. The level of each pigment in the individual inks is conformed to the respective requirements (e.g., trichromism).

The following pigment combinations are particularly recommended:

C.I. Pigment Yellow 138, C.I. Pigment Violet 19, C.I. Pigment Blue 15:3 and C.I. Pigment Black 7;

C.I. Pigment Yellow 138, C.I. Pigment Red 122, C.I. Pigment Blue 15:3 or 15:4 and C.I. Pigment Black 7;

C.I. Pigment Yellow 138, C.I. Pigment Violet 19, C.I. Pigment Blue 15:3, C.I. Pigment Black 7, C.I. Pigment Orange 43 and C.I. Pigment Green 7;

C.I. Pigment Yellow 138, C.I. Pigment Red 122, C.I. Pigment Blue 15:3 or 15:4, C.I. Pigment Black 7, C.I. Pigment Orange 5 and C.I. Pigment Green 7;

C.I. Pigment Yellow 138, C.I. Pigment Red 122, C.I. Pigment Blue 15:3 or 15:4, C.I. Pigment Black 7, C.I. Pigment Orange 38 and C.I. Pigment Green 7;

C.I. Pigment Yellow 138, C.I. Pigment Red 122, C.I. Pigment Blue 15:3 or 15:4, C.I. Pigment Black 7, C.I. Pigment Orange 43 and C.I. Pigment Green 7.

Useful dyes (A1), which are essentially insoluble in the water/solvent mixture, in addition to the vat dyes already mentioned include in particular azo, anthraquinone, quinophthalone, benzodifuran, methine and azamethine dyes which are free of acidic or ionic groups.

Examples of useful dyes (A1) are specifically:

C.I. Disperse Yellow 1, 2, 3, 4, 5, 6, 7, 8, 9, 10, 11, 11:1, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 179, 180, 181, 182, 183, 184, 184:1, 200, 201, 202, 203, 204, 205, 206, 207, 208, 209, 210, 211, 212, 213, 214, 215, 216, 217, 218, 219, 220, 221, 222, 223, 224, 225, 226, 227 and 228;

C.I. Disperse Orange 1, 2, 3, 3:3, 4, 5, 6, 7, 8, 9, 10, 11, 12, 13, 14, 15, 16, 17, 18, 19, 20, 21, 22, 23, 24, 25, 25:1, 26, 27, 28, 29, 30, 31, 32, 33, 34, 35, 36, 37, 38, 39, 40, 41, 41:1, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 126, 127, 128, 129, 130, 131, 136, 137, 138, 139, 140, 141, 142, 143, 145, 146, 147 and 148;

C.I. Disperse Red 1, 2, 3, 4, 5, 5:1, 6, 7, 8, 9, 10, 11, 12, 13, 14, 15, 16, 17, 18, 19, 20, 21, 22, 23, 24, 25, 26, 27, 28, 29, 30, 30:1, 31, 32, 33, 34, 35, 36, 38, 39, 40, 41, 43, 43:1, 46, 48, 50, 51, 52, 53, 54, 55, 55:1, 56, 58, 59, 60, 61, 63, 65, 66, 69, 70, 72, 73, 74, 75, 76, 77, 79, 80, 81, 82, 84, 85, 86, 86:1, 87, 88, 89, 90, 91, 92, 93, 94, 96, 97, 98, 100, 102, 103, 104, 105, 106, 107, 108, 109, 110, 111, 112, 113, 115, 116, 117, 118, 120, 121, 122, 123, 125, 126, 127, 128, 129, 130, 131, 132, 133, 134, 135, 136, 137, 138, 139, 140, 141, 142, 143, 144, 145, 146, 147, 148, 149, 150, 151, 151:1, 152, 153, 154, 155, 156, 157, 158, 159, 160, 161, 162, 163, 164, 165, 166, 167, 167:1, 168, 169, 170, 171, 172, 173, 174, 175, 176, 177, 178, 179, 180, 181, 182, 183, 184, 185, 186, 187, 188, 189, 190, 190:1, 191, 191:1, 192, 193, 194, 195, 211, 223, 273, 274, 275, 276, 277, 278, 279, 280, 281, 302:1, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 338, 339, 340, 341, 342, 343, 344, 346, 347, 348, 349, 356 and 367;

C.I. Disperse Violet 1, 2, 3, 4, 4:1, 5, 6, 7, 8, 9, 10, 11, 12, 13, 14, 15, 16, 17, 18, 19, 20, 21, 22, 23, 24, 25, 26, 27, 28, 29, 31, 33, 34, 35, 36, 37, 38, 39, 40, 41, 42, 43, 44, 45, 46, 47, 48, 49, 50, 51, 52, 53, 54, 55, 56, 57, 58, 59, 60, 70, 81, 86, 87, 88, 89, 91, 92, 93, 94, 96 and 97;

C.I. Disperse Blue 1, 1:1, 2, 3, 3:1, 4, 5, 6, 7, 7:1, 8, 9, 10, 11, 12, 13, 13:1, 14, 15, 16, 17, 18, 19, 20, 21, 22, 23, 23:1, 24, 25, 26, 27, 28, 29, 30, 31, 32, 33, 34, 35, 36, 38, 39, 40, 42, 43, 44, 45, 47, 48, 49, 51, 52, 53, 54, 55, 56, 58, 60, 60:1, 61, 62, 63, 64, 64:1, 65, 66, 68, 70, 72, 73, 75, 76, 77, 79, 80, 81, 81:1, 82, 83, 84, 85, 86, 87, 88, 89, 90, 91, 92, 93, 94, 95, 96, 97, 98, 99, 100, 101, 102, 103, 104, 105, 106, 107, 108, 109, 111, 112, 113, 114, 115, 116, 117, 118, 119, 121, 122, 123, 124, 125, 126, 127, 128, 130, 131, 132, 133, 134, 136, 137, 138, 139, 140, 141, 142, 143, 144, 145, 146, 147, 148, 149, 150, 151, 152, 153, 154, 155, 156, 158, 159, 160, 161, 162, 163, 164, 165, 165:2, 166, 167, 168, 169, 170, 171, 172, 173, 174, 175, 195, 281, 282, 283, 283:1, 284, 285, 286, 287, 288, 289, 290, 291, 292, 293, 294, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347 and 349;

C.I. Disperse Green 1, 2, 5, 6 and 9;

C.I. Disperse Brown 1, 2, 3, 4, 4:1, 5, 7, 8, 9, 10, 11, 18, 19, 20 and 21;

C.I. Disperse Black 1, 3, 4, 5, 6, 7, 8, 9, 10, 11, 12, 13, 14, 15, 20, 22, 24, 25, 26, 27, 28, 29, 29:1, 30, 31, 32, 33, 34 and 36;

C.I. Solvent Yellow 2, 3, 7, 12, 13, 14, 16, 18, 19, 21, 25, 25:1, 27, 28, 29, 30, 33, 34, 36, 42, 43, 44, 47, 56, 62, 72, 73, 77, 79, 81, 82, 83, 83:1, 88, 89, 90, 93, 94, 96, 98, 104, 107, 114, 116, 117, 124, 130, 131, 133, 135, 141, 143, 144, 145, 146, 157, 160:1, 161, 162, 163, 167, 169, 172, 173, 176, 179, 180, 181, 182, 183, 184, 185, 186, 187, 189, 190 and 191;

C.I. Solvent Orange 1, 2, 3, 4, 5, 7, 11, 14, 20, 23, 25, 31A, 40:1, 41, 45, 54, 56, 58, 60, 62, 63, 70, 75, 77, 80, 81, 86, 99, 102, 103, 105, 106, 107, 108, 109, 110, 111, 112 and 113;

C.I. Solvent Red 1, 2, 3, 4, 8, 16, 17, 18, 19, 23, 24, 25, 26, 27, 30, 33, 35, 41, 42, 45, 48, 49, 52, 68, 69, 72, 73, 83:1, 84:1, 89, 90, 90:1, 91, 92, 106, 109, 111, 118, 119, 122, 124, 125, 127, 130, 132, 135, 141, 143, 145, 146, 149, 150, 151, 155, 160, 161, 164, 164:1, 165, 166, 168, 169, 172, 175, 179, 180, 181, 182, 195, 196, 197, 198, 207, 208, 210, 212, 214, 215, 218, 222, 223, 225, 227, 229, 230, 233, 234, 235, 236, 238, 239, 240, 241, 242, 243, 244, 245, 247 and 248, C.I. Solvent Violet 2, 8, 9, 11, 13, 14, 21, 21:1, 26, 31, 36, 37, 38, 45, 46, 47, 48, 49, 50, 51, 55, 56, 57, 58, 59, 60 and 61;

C.I. Solvent Blue 2, 3, 4, 5, 7, 18, 25, 26, 35, 36, 37, 38, 43, 44, 45, 48, 51, 58, 59, 59:1, 63, 64, 67, 68, 69, 70, 78, 79, 83, 94, 97, 98, 99, 100, 101, 102, 104, 105, 111, 112, 122, 124, 128, 129, 132, 136, 137, 138, 139 and 143, C.I. Solvent Green 1, 3, 4, 5, 7, 28, 29, 32, 33, 34 and 35;

C.I. Solvent Brown 1, 3, 4, 5, 12, 20, 22, 28, 38, 41, 42, 43, 44, 52, 53, 59, 60, 61, 62 and 63;

C.I. Solvent Black 3, 5, 5:2, 7, 13, 22, 22:1, 26, 27, 28, 29, 34, 35, 43, 45, 46, 48, 49 and 50;

Also useful are substituted benzodifuranone dyes whose basic structure conforms to the formula

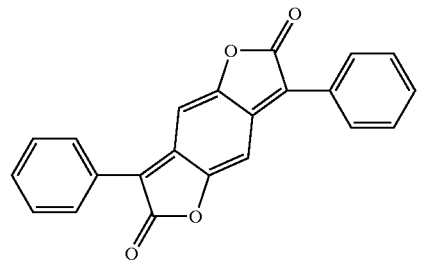

Such dyes may be substituted on either or both phenyl rings. Useful substituents include halogen, alkyl (which may be interrupted by nonadjacent oxygen atoms), alkoxy (whose alkyl radical may be interrupted by oxygen atoms and may in addition be substituted), hydroxyl, substituted or unsubstituted amino, cyano, nitro and alkoxycarbonyl.

It is further possible to use dyes of the following formulae:

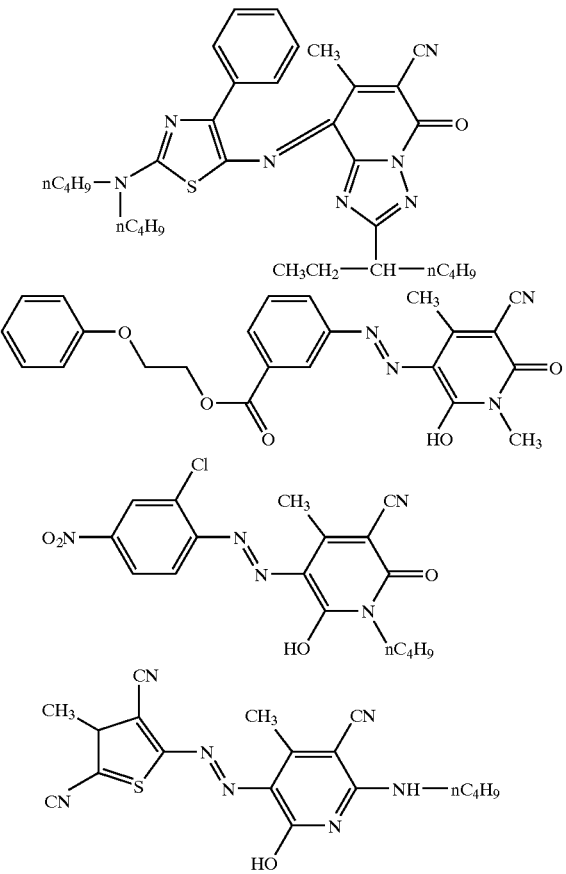

Further examples of insoluble dyes (A1) are recited in WO-A-97/46623, 98/24850 and 99/29783.

The undissolved, dispersed colorant (A1) should be very finely divided. It is preferred for 95%, particularly preferably 99%, of the particles of colorant (A1) to have a particle size $\leq 1$ μm, preferably $\leq 0.5$ μm.

Useful dyes (A2), which are soluble in the water/solvent mixture, are in particular arylmethane, azo, methine, rhodamine and metal complex dyes containing acidic or ionic groups.

Examples of useful dyes (A2) are specifically:

C.I. Basic Yellow 2, 37, 78, 94, 96, 97, 98, 102 and 111;

C.I. Basic Orange 2, 60, 62 and 63;
C.I. Basic Red 1, 14, 49, 108 and 111;
C.I. Basic Violet 1, 3, 4, 10, 11, 49 and 50;
C.I. Basic Blue 26, 152, 157, 158 and 161;
C.I. Basic Green 1 and 4;
C.I. Basic Brown 1;
C.I. Acid Orange 7 and 8;
C.I. Acid Blue 9;
C.I. Direct Yellow 4, 5, 11, 15, 127, 131 and 147;
C.I. Direct Red 239 and 254;
C.I. Direct Blue 161, 199, 279 and 281;
C.I. Reactive Red 120.

Colorant preparations according to the invention generally include from 0.01 to 20% by weight, preferably from 0.2 to 10% by weight, particularly preferably from 1 to 6% by weight, of colorant (A), particularly useful amounts for colorant (A1) being within the range from 1 to 6% by weight and for colorant (A2) within the range from 1 to 10% by weight.

When colorant preparations according to the invention are based on undissolved colorants (A1), they will include a dispersant (B). In the case of dissolved colorants (A2), it will be appreciated that component (B) is not necessary.

Component (B) may in principle be any dispersant known for aqueous systems.

Particularly useful components (B) include water-soluble dispersants based on one or more water-soluble alkoxylated phenols (B1), one or more arylsulfonic acid-formaldehyde condensation products (B2), one or more condensation products of an at least difunctional isocyanate with compounds (B3) each bearing one isocyanate-reactive group, one or more alkoxylated hydroxynaphthalenes (B4) or one or more alkoxylation products of at least difunctional aliphatic or aromatic amines having up to 8 carbon atoms.

Preferred dispersants (B1) are alkoxylated phenols of the formula I or II

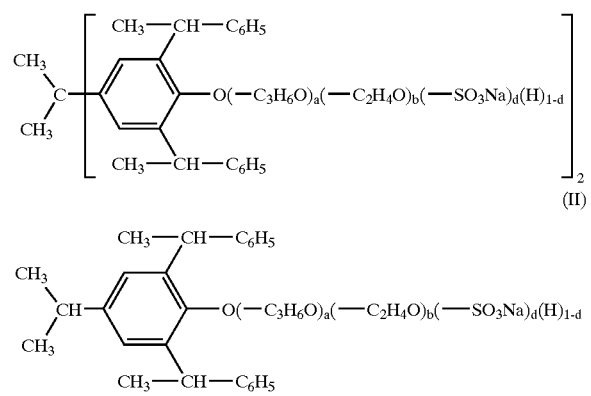

where
a is from 0 to on average 125,
b is on average from 37 to 250, the ratio b:a being at least 1:1 when b>37, and
d is 0 or 1,
or mixtures thereof.

The products of the formulae I and II can be obtained by reacting the phenol derivatives of the formula III or IV

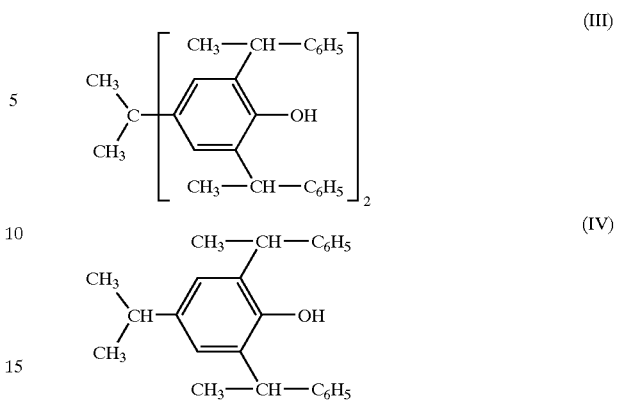

with propylene oxide and subsequent reaction of the adduct with ethylene oxide or by reacting III and/or IV with ethylene oxide. If desired, the adducts are reacted with chlorosulfonic acid or sulfur trioxide to convert them completely or partially into acid sulfuric esters and the resulting acid esters are neutralized with alkalis.

The phenols of the formulae III and IV can be obtained by reacting phenol or 2,2-(p,p'-bishydroxydiphenyl)propane with 3 or 4 mol of styrene in the presence of an acid as catalyst. The phenols III and IV are reacted according to known processes first with ethylene oxide or only with ethylene oxide in the presence of acidic or alkaline catalysts to form the corresponding alkoxylation products I and II where d=0. The alkoxylation can be carried out, for example, according to the process described in U.S. Pat. No. 2,979,528. When b>37, it is mandatory that the ratio $$\frac{b}{a} > 1.$$

The acid sulfuric esters are prepared by reaction of the alkoxylation products with chlorosulfonic acid or sulfur trioxide, the amount being selected so that all the free hydroxyl groups are sulfated or only a portion thereof. The latter case produces mixtures of compounds of the formulae I and II which contain free and sulfated hydroxyl groups. For use as dispersant, the as-synthesized acid esters of sulfuric acid are converted into water-soluble salts. Advantageous water-soluble salts are the alkali metal salts, for example the sodium or potassium salts. For this two equivalents of the basic compounds are required in the case of chlorosulfonic acid, one equivalent in the case of sulfur trioxide. The basic compound used is advantageously an aqueous alkali metal hydroxide. The neutralization temperature should not exceed 70° C. The salts obtained can be used in the form of aqueous solutions or else isolated as such and used in solid form.

Preference is given to dispersants (B1) where a is from 0 to on average 2.5, b is on average from 37 to 250 and d is from 0 to on average 0.5. Particular preference is given to dispersants (B1) where a is 0 to on average 2.5, b is on average from 50 to 100 and d is on average 0.5.

The dispersants (B1) are known; cf. U.S. Pat. No. 4,218, 218, for example.

The condensation products (B2) are obtainable by sulfonation of aromatic compounds such as naphthalene itself or naphthalene-comprising mixtures and subsequent condensation of the resulting arylsulfonic acids with formaldehyde.

A suitable starting material for preparing arylsulfonic acids is, for example, a mixture of aromatic compounds which are obtainable by thermal cracking of a naphthenic residue oil and fractionation of the cracking products. Naphthenic residue oils are obtained for example in the cracking of light gasoline and are also referred to as high boiling aromatic hydrocarbon oils. The naphthenic residue oil is preferably thermally cracked at 1400–1700° C. The cracking products are then subjected to a fractional distillation. The fraction which passes over at atmospheric pressure (1013 mbar) and 100–120° C. is collected and used as the aromatic compound in the sulfonation. Such a fraction is customarily obtained as a by-product in the known acetylene oil quench process (Ullmann's Encyclopedia of Industrial Chemistry, VCH Verlagsgesellschaft mbH, Weinheim, 1985, Volume A1, pages 107 to 112).

This aromatics fraction is a mixture of a multiplicity of aromatic substances whose structures and amount can in practice not be determined in detail. The following aryl compounds are the main representatives of this aromatics fraction:

|  | % by weight of aromatics fraction |
| --- | --- |
| Naphthalene | 30–55 |
| 2-Methylnaphthalene | 5–15 |
| 1-Methylnaphthalene | 4–10 |
| Indene | 3–10 |
| Biphenyl | 1–5 |
| Methylindene | 1–5 |
| Acenaphthene | 1–4 |

The aromatics fraction further comprises in terms of identified constituents in amounts from 0.1 to about 2% by weight of the following aryl compounds: fluorene, indan, methylstyrene, phenanthrene, methylindan, dimethylnaphthalene, ethylnaphthalene, xylenes, tetralin, styrene, methylethylbenzene, anthracene, fluoranthrene, pyrene, acenaphthylene and toluene.

Particularly suitable arylsulfonic acids generally comprise α- and β-naphthalenesulfonic acids, the ratio of the α- to the β-isomers being customarily within the range from 20:1 to 1:8, especially within the range from 10:1 to 1:5.

The condensation products based on the abovementioned aromatics fraction preferably have a sulfonic acid group content of not more than 40% by weight.

The preparation of dispersant (B2) can be effected in the presence of aromatic or long-chain aliphatic carboxylic acids, their salts, anhydrides or mixtures thereof.

Examples of suitable aromatic carboxylic acids and derivatives thereof are naphthalenecarboxylic acid, naphthalic acid, terephthalic acid, isophthalic acid, benzoic acid, trimellitic acid, phenylacetic acid, phenoxyacetic acid, salicylic acid, p-hydroxybenzoic acid, diphenylacetic acid, m-hydroxybenzoic acid, benzenetetracarboxylic acid or acid anhydrides such as phthalic anhydride, trimellitic anhydride, benzene-1,2,4,5-tetracarboxylic dianhydride or naphthalic anhydride.

Suitable long-chain aliphatic carboxylic acids include in particular saturated or olefinically unsaturated, linear or branched aliphatic monocarboxylic acids having from 8 to 22, preferably from 8 to 18, carbon atoms of a natural or synthetic origin, for example higher fatty acids such as caprylic acid, capric acid, lauric acid, myristic acid, palmitic acid, stearic acid, oleic acid, linoleic acid or linolenic acid or synthetically produced carboxylic acids such as 2-ethylhexanoic acid, isononanoic acid or isotridecanoic acid.

Suitable salts of the carboxylic acids mentioned are the alkali metal, ammonium or alkaline earth metal salts, said alkali metal, ammonium or alkaline earth metal salts being obtainable, for example, by neutralization of the corresponding carboxylic acids with sodium hydroxide, potassium hydroxide, lithium hydroxide, sodium carbonate, magnesium carbonate, calcium oxide, calcium hydroxide, ammonia or alkanolamines such as ethanolamine, diethanolamine or triethanolamine.

Particular preference is given to sodium benzoate, sodium phenylacetate, sodium salicylate, sodium 4-hydroxybenzoate, sodium terephthalate, sodium 2-hydroxy-3-naphthalenecarboxylate, naphthalene-1-carboxylic acid, phthalic anhydride or benzoic acid.

Dispersants (B2) which are particularly suitable in this case comprise from 50 to 97% by weight, especially from 70 to 95% by weight, of arylsulfonic acid/formaldehyde condensation products and from 3 to 50% by weight, especially from 5 to 30% by weight, of aromatic or long-chain aliphatic carboxylic acids, their salts or their anhydrides or mixtures thereof.

To prepare the arylsulfonic acid/formaldehyde condensation products (B2) it is advantageous to start from pure naphthalene (purity generally >95%).

In the condensation, it is customary to use from 0.5 to 1.5 mol, preferably from 0.7 to 1 mol, of formaldehyde per mole of naphthalene.

The sulfonic acid group content of these condensation products is advantageously within the range from about 40 to 50% by weight.

The dispersants (B2) are known; cf. for example U.S. Pat. No. 5,186,846, DE-A-11 37 005 or EP-A-380 778.

The dispersants (B3) are condensation products of at least difunctional isocyanates, which serve as point of attachment, with a polymeric compound (hereinafter referred to as stabilizer block) which is terminated at one end by an isocyanate-reactive group and which makes solid particles to be dispersed compatible with the dispersion medium, and an anchor group block, which can be either a homo- or copolymer of a nitrogenous monomer or an organic phosphonic ester, which each possess an isocyanate-reactive group and which each sorb onto the solid particles to be dispersed.

The isocyanate connecting the stabilizer block and the anchor group block is a diisocyanate or a more highly functional polyisocyanate having an average NCO functionality of from 2.0 to 4.5.

The diisocyanates can be aromatic or aliphatic, preference being given to aliphatic diisocyanates, such as tetramethylene diisocyanate, hexamethylene diisocyanate, octamethylene diisocyanate, decamethylene diisocyanate, dodecamethylene diisocyanate, tetradecamethylene diisocyanate, trimethylhexane diisocyanate or tetramethylhexane diisocyanate, 1,4-, 1,3- or 1,2-diisocyanatocyclohexane, 4,4'-di(isocyanatocyclohexyl)methane, 1-isocyanato-3,3,5-trimethyl-5-(isocyanatomethyl)cyclohexane (isophorone diisocyanate) or 2,4- or 2,6-diisocyanato-1-methylcyclohexane, particular preference being given to hexamethylene diisocyanate and isophorone diisocyanate.

The higher polyisocyanates may likewise be aromatic or aliphatic. Here too preference is given to aliphatic polyisocyanates, especially those having an average NCO functionality of from 1.7 to 5, especially about 3. The following groups are mentioned by way of example:

(a) Isocyanurate group containing polyisocyanates of aliphatic and/or cycloaliphatic diisocyanates. Particular preference is given here to the corresponding isocyanato-isocyanurates based on hexamethylene diisocyanate and isophorone diisocyanate. These isocyanurates are in particular simple trisisocyanatoalkyl or trisisocyanatocycloalkyl isocyanurates, which are cyclic trimers of the diisocyanates, or mixtures with their higher homologs containing more than one isocyanurate ring. The isocyanato-isocyanurates generally have an NCO content of from 10 to 30% by weight, in particular from 15 to 25% by weight, and an average NCO functionality of from 2.6 to 4.5.

(b) Uretdione diisocyanates having aliphatically and/or cycloaliphatically attached isocyanate groups, which are preferably derived from hexamethylene diisocyanate or isophorone diisocyanate. Uretdione diisocyanates are cyclic dimerization products of diisocyanates.

(c) Biuret group containing polyisocyanates having aliphatically attached isocyanate groups, especially tris (6-isocyanatohexyl)biuret or its mixtures with its higher homologs. These biuret group containing polyisocyanates generally have an NCO content of from 18 to 25% by weight and an average NCO functionality of from 3 to 4.5.

(d) Urethane and/or allophanate group containing polyisocyanates having aliphatically or cycloaliphatically attached isocyanate groups, as are obtainable for example by reaction of excess amounts of hexamethylene diisocyanate or of isophorone diisocyanate with simple polyhydric alcohols, such as trimethylolpropane, glycerol, 1,2-dihydroxypropane or mixtures thereof. These urethane and/or allophanate group containing polyisocyanates generally have an NCO content of from 12 to 20% by weight and an average NCO functionality of from 2.5 to 3.

(e) Oxadiazinetrione group containing polyisocyanates, preferably derived from hexamethylene diisocyanate or isophorone diisocyanate. Such oxadiazinetrione group containing polyisocyanates are preparable from diisocyanate and carbon dioxide.

(f) Uretoneimine-modified polyisocyanates.

The polymeric compound forming the stabilizer block is preferably a polymeric compound of the general formula V $$R^1—M_n—XH \quad (V)$$

where

R$^1$ is hydrogen, linear or branched C$_1$–C$_{28}$-alkyl, linear or branched, singly or multiply unsaturated C$_2$–C$_{28}$-alkenyl, linear or branched, singly or multiply unsaturated C$_2$–C$_{28}$-alkynyl or the residue of polymerization initiator or of a chain regulator, M represents identical or different polymerized units of monomers selected from the group consisting of α,β-ethylenically unsaturated mono- or dicarboxylic acids; unsubstituted or hydroxyl-, C$_1$–C$_6$-alkoxy-, polyalkyleneoxy- or halogen-mono- or -polysubstituted C$_1$–C$_{20}$-(cyclo)alkyl or C$_7$–C$_{20}$-aralkyl esters, amides, nitriles or anhydrides of α,β-ethylenically unsaturated mono- or dicarboxylic acids; vinyl or allyl esters of aliphatic or aromatic carboxylic acids; vinyl or allyl ethers; ethylenically unsaturated sulfonic acids or sulfonic acid derivatives; halogenated or unhalogenated ethylenically unsaturated aliphatic C$_2$–C$_{20}$ hydrocarbons; aromatic ethylenically unsat urated compounds and compounds polymerizable to form polyphosphacenes; or is

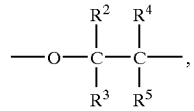

—O—CO—R$^6$—, —CO—O—R$^6$—
or —CO—O—R$^7$—O—CO—R$^8$— where R$^2$, R$^3$, R$^4$ and R$^5$ are independently H, C$_1$–C$_6$-alkyl, C$_6$–C$_{20}$-aryl, —CH$_2$—Cl or —CH$_2$—OH, and R$^6$, R$^7$ and R$^8$ are independently a C$_2$–C$_{20}$-alkylene, arylene or aralkylene group, and n is an integer between 0 and 10,000, preferably ≧2, especially ≧3, particularly preferably within the range from 30 to 1000, and X is COO, O, S or NR$^9$, where R$^9$ is H or a C$_1$–C$_6$-alkyl group.

The polymeric compound V is preferably constructed using C$_1$–C$_8$-alkyl (meth)acrylates. Particular preference is given to polymerizing one or more C$_1$–C$_4$-alkyl methacrylates, especially methyl methacrylate and/or butyl methacrylate. The isocyanate-reactive group XH is preferably a hydroxyl group which may be introduced into the terminal position of the polyacrylate with the aid of initiators which provide a hydroxyl free radical on decomposition and/or with the aid of chain regulators which contain a hydroxyl group.

The polymeric compound V is most preferably a mono (generally C$_1$–C$_{18}$, preferably C$_1$–C$_4$)alkyl ether of a poly (especially C$_2$–C$_4$)alkylene glycol, which may be obtained for example by reacting an alkanol with an alkene oxide, such as ethylene oxide, propylene oxide and butylene oxide, or epichlorohydrin. Of particular suitability are C$_1$–C$_{18}$ (especially C$_1$–C$_4$) alkanols alkoxylated with from 5 to 10,000, preferably from 5 to 80, mol of ethylene oxide and/or propylene oxide, and polyethylene glycol monomethyl ethers are very particularly useful.

The weight average molecular weight of the stabilizer block is preferably within the range from about 250 to 100,000, especially within the range from about 500 to 7000.

An anchor group block embodiment useful for constructing the dispersant (B3) is based on homo- or copolymers of one or more monomers selected from the group consisting of N-vinylamides, N-vinyllactams and vinyl- or allyl-substituted nitrogenous heterocycles. Examples of particularly useful monomers are N-vinylpyrrolidone, N-vinylpyridine, N-vinylcaprolactam, N-vinylimidazole and N-vinylformamide, of which N-vinylpyrrolidone is preferred. The homo- or copolymer preferably has a K value of from 10 to 100, especially from 10 to 30. Termination in the form of a hydroxyl group as isocyanate-reactive group may be accomplished by conducting the polymerization in water or a lower alcohol such as isopropanol or by polymerization in the presence of an appropriate chain regulator and/or initiator.

A further anchor group block embodiment useful for constructing the dispersant (B3) is formed of phosphonic esters of the formula VI

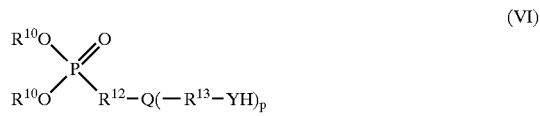

(VI)

where

R$^{10}$ and R$^{11}$ are independently C$_1$–C$_4$-alkyl, especially $R^{10}=R^{11}$=methyl or ethyl;

Q is $NR_{(2-p)}$ or $CR_{(3-p)}$ (R=H or $C_1$–$C_8$-alkyl);

$R^{12}$ and $R^{13}$ are independently a chemical bond or unsubstituted or $C_1$–$C_8$-alkyl- or aryl-substituted $C_1$–$C_{10}$-alkylene with or without interruption by O, NR, CO, COO, OCO, CONR or NRCO;

p is 1 or 2; and

Y is COO, O, S or $NR^{14}$, where $R^{14}$ is H or a $C_1$–$C_6$ alkyl group.

Preferred examples of these phosphonic esters are diethyl N,N-bis(hydroxyethyl)aminomethylphosphonate, the dimethyl or diethyl esters of 3-hydroxymethylamino-3-oxopropylphosphonic acid, 3-aminopropylphosphonic acid, 1-aminopropylphosphonic acid, 2-aminooctylphosphonic acid, 1-aminooctylphosphonic acid, 1-aminobutylphosphonic acid, hydroxymethylphosphonic acid and 1-hydroxyethylphosphonic acid.

The reaction of the di- or polyisocyanate with the stabilizer block and the anchor group block can take place in two steps or in a one-pot reaction. Preferably, however, the reaction takes place in two steps where the di- or polyisocyanate is reacted with the stabilizer block in the first step. The reaction can take place in the absence or presence of a solvent, preference being given to the reaction in the presence of a solvent, such as acetone, THF, toluene, dioxane. When the stabilizer block has been prepared by polymerization of an ethylenically unsaturated compound, the reaction of the stabilizer block with the di- or polyisocyanate can advantageously be carried out in the same solvent as the free-radical polymerization. The reaction can be carried out without catalyst or preferably in the presence of a catalyst, such as a tertiary amine, especially triethylamine, or a metal salt, especially tin octoate or lead octoate, or an organometallic compound, such as dibutyltin dilaurate or titanium tetramethoxide. The reaction is generally carried out at a temperature from room temperature to 125° C., especially within the range from 40 to 90° C.

Further details concerning the dispersants (B3) are described in DE-A-198 42 952.

The dispersants (B4) are alkoxylated hydroxynaphthalenes, and ethoxylated β-hydroxynaphthalenes are preferred. The dispersants (B4) generally have a molecular weight $M_W$ in the range from 2000 to 40,600 g/mol, especially in the range 20,000 to 35,000 g/mol and particularly in the range from 25,000 to 30,000 g/mol.

The dispersants (B4) are generally known and available in a conventional manner by alkoxylation of hydroxynaphthalene.

Dispersants (B5) are usefully alkoxylation products of at least bifunctional aliphatic or aromatic amines having up to 8 carbon atoms, especially initially propoxylated and then ethoxylated amines. Useful amino components include polyfunctional aliphatic amines such as ethylenediamine, diethylenetriamine, triethylenetetramine, tetraethylenepentamine and hexamethylenediamine and aromatic amines such as phenylenediamine and also alcoholamines such as monoethanolamine, diethanolamine, triethanolamine, isopropanolamine, tri(2-propanol)amine, 2-amino-1-butanol, N-butyl-di(2-propanol)amine and aminophenols, preference being given to polyfunctional alkyleneamines, especially ethylenediamine.

The average molecular weight of the condensation products (B5) is preferably in the range from 3000 to 20,000 g/mol and particularly in the range from 4000 to 15,000 g/mol.

The ethylene oxide content of these block copolymers is customarily in the range from 20 to 45% by weight.

The dispersants (B5) are known and described for example in U.S. Pat. No. 2,979,528 and DE-A 31 51 753.

Colorant preparations according to the invention include generally from 0.1 to 25% by weight, preferably from 0.5 to 10% by weight, of dispersant (B) in the case of an undissolved colorant (A1).

Component (C) of colorant preparations according to the invention is an organic solvent. Low molecular weight polytetrahydrofuran (C1) is an essential constituent of component (C); it can be used alone or preferably in mixture with one or more high-boiling water-soluble or -miscible organic solvents (C2).

The polytetrahydrofuran (C1) used according to the invention customarily has an average molecular weight $M_W$ of from 150 to 500 g/mol, preferably from 200 to 300 g/mol, particularly preferably about 250 g/mol (corresponding to a molecular weight distribution of from 225 to 275 g/mol; Poly-THF 250, BASF).

The polytetrahydrofuran (C1) may be prepared in known manner by cationic polymerization of tetrahydrofuran. The products are linear polytetramethylene glycols.

When the polytetrahydrofuran (C1) is present in a mixture with further organic solvents (C2), the invention provides that the solvents used be high-boiling (i.e., boiling point generally >100° C.) and hence water-retaining organic solvents that are soluble in or miscible with water.

Useful solvents (C2) include polyhydric alcohols, preferably branched or unbranched polyhydric alcohols containing from 2 to 8, especially from 3 to 6, carbon atoms, such as ethylene glycol, 1,2- and 1,3-propylene glycol, glycerol, erythritol, pentaerythritol, pentitols such as arabitol, adonitol and xylitol and hexitols such as sorbitol, mannitol and dulcitol.

Useful solvents (C2) further include polyethylene glycols and polypropylene glycols (which is also to be understood as meaning the lower polymers (di-, tri- and tetramers)) and their mono (especially $C_1$–$C_6$, in particular $C_1$–$C_4$) alkyl ethers. Preference is given to polyethylene and polypropylene glycols having average molecular weights of from 100 to 1500 g/mol, in particular from 200 to 800 g/mol, mainly from 300 to 500 g/mol. Examples are diethylene glycol, triethylene glycol, tetraethylene glycol, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, di-, tri- and tetra-1,2- and -1,3-propylene glycol and di-, tri- and tetra-1,2- and -1,3-propylene glycol monomethyl, monoethyl, monopropyl and monobutyl ether.

Useful solvents (C2) further include pyrrolidone and N-alkylpyrrolidones whose alkyl chain preferably contains from 1 to 4, especially 1 or 2, carbon atoms. Examples of useful alkylpyrrolidones are N-methylpyrrolidone, N-ethylpyrrolidone and N-(2-hydroxyethyll)pyrrolidone.

Examples of particularly preferred solvents (C2) are 1,2-propylene glycol, 1,3-propylene glycol, glycerol, sorbitol, diethylene glycol, polyethylene glycol ($M_W$ from 300 to 500 g/mol), diethylene glycol monobutyl ether, triethylene glycol monobutyl ether, pyrrolidone, N-methylpyrrolidone and N-(2-hydroxyethyl)pyrrolidone.

The polytetrahydrofuran (C1) may be mixed with one or more (e.g., two, three or four) solvents (C2).

Colorant preparations according to the invention generally include from 0.1 to 40% by weight, preferably from 5 to 30% by weight, particularly preferably from 10 to 25% by weight and very particularly preferably from 10 to 20% by weight, of solvent component (C).

The weight ratio of (C2) to (C1) is preferably within the range from 20:1 to 1:1. Colorant preparations according to the invention accordingly preferably include from 0.5 to 20% by weight, especially from 1 to 10% by weight, of polytetrahydrofuran (C1) and from 1 to 30% by weight, especially from 1 to 20% by weight, of solvent (C2).

An example of a particularly preferred solvent component (C) is the combination of from 1 to 10% by weight of polytetrahydrofuran ($M_W$ from 150 to 500 g/mol), from 1 to 10% by weight of glycerol, sorbitol and/or propylene glycol, from 1 to 10% by weight of polyethylene glycol ($M_W$ from 300 to 500 g/mol) and from 1 to 10% by weight of di- and/or triethylene glycol monobutyl ether (amounts each based on the weight of the colorant preparation).

The solvent component (C), including especially the aforementioned particularly preferred solvent combination, may advantageously be supplemented by urea (generally from 0.5 to 3% by weight, based on the weight of the colorant preparation), which further enhances the water-retaining effect of solvent mixture (C).

Water is the main constituent (D) of colorant preparations according to the invention. The water content is customarily within the range from 50 to 95% by weight. The preferred water content is from 60 to 80% by weight in the case of binder-free preparations and from 50 to 75% by weight in the case of binder-containing preparations.

Colorant preparations according to the invention may self-evidently include further assistants of the type which are customary especially for (aqueous) ink-jet inks and in the printing and coatings industry. Examples of such assistants include preservatives (such as 1,2-benzisothiazolin-3-one and its alkali metal salts, glutaraldehyde and/or tetramethylolacetylenediurea), antioxidants, degassers/defoamers (such as acetylenediols and ethoxylated acetylenediols, which customarily contain from 20 to 40 mol of ethylene oxide per mole of acetylenediol and also have a dispersing effect), viscosity regulators, flow agents, wetters (e.g., wetting surfactants based on ethoxylated or propoxylated fatty or oxo alcohols, propylene oxide/ethylene oxide block copolymers, ethoxylates of oleic acid or alkylphenols, alkylphenol ether sulfates, alkylpolyglycosides, alkyl phosphonates, alkylphenyl phosphonates, alkyl phosphates, alkylphenyl phosphates or preferably polyether siloxane copolymers, especially alkoxylated 2-(3-hydroxypropyl) heptamethyl trisiloxanes, which generally have a block of from 7 to 20 and preferably of from 7 to 12 ethylene oxide units and a block of from 2 to 20 and preferably of from 2 to 10 propylene oxide units and may be present in the colorant preparations in amounts of from 0.05 to 1% by weight), anti-settlers, luster improvers, lubricants, adhesion improvers, anti-skinning agents, delusterants, emulsifiers, stabilizers, water repellents, light control additives, hand improvers, antistats and bases such as triethanolamine for regulating the pH. If such assistants are part of the pigment preparations of the invention, their total amount is generally $\leq 2\%$ by weight, especially $\leq 1\%$ by weight, based on the weight of the colorant preparation.

Binder-free colorant preparations according to the invention customarily have a dynamic viscosity of from 1 to 7 mm²/sec, preferably from 1 to 5 mm²/sec, especially from 1 to 3 mm²/sec. Binder-containing colorant preparations according to the invention have a dynamic viscosity of generally from 1 to 25 mm²/sec, preferably from 1 to 15 mm²/sec, mainly from 1 to 10 mm²/sec.

The surface tension of colorant preparations according to the invention (binder-free or -containing) is generally within the range from 24 to 70 mN/m, especially from 30 to 60 mN/m.

The pH of colorant preparations according to the invention is generally from 5 to 10, preferably from 7 to 9.

Colorant preparations according to the invention which are based on undissolved colorant (A1) are advantageously prepared as follows:

The colorant (A1), for example in the form of an aqueous presscake, is mixed together with the dispersant (B) in the presence of water and dispersed in a suitable apparatus. The resulting mixture is then ground in a mill to the desired particle size distribution (generally $\leq 1$ μm, preferably $\leq 0.5$ μm). After the desired colorant concentration has been set by addition of solvent (C), water and optionally further assistants, the preparation is filtered using a filtering means with fines removal within the range from 1 to 0.5 μm.

Particularly useful starting materials for preparations of dissolved dye (A2) are more highly concentrated dye solutions, for example paper dye liquid formulations from 10 to 30% strength by weight. These are, if appropriate, desalted and filtered (e.g., nanofiltration) before the desired dye concentration is set.

The colorant preparations of the invention can be used with advantage in the process of the invention for printing sheetlike or three-dimensionally configured substrates by the ink-jet process, which comprises printing the colorant preparations onto the substrate and if desired subsequently fixing the print obtained.

In the ink-jet process, the typically aqueous inks are sprayed as small droplets directly onto the substrate. There is a continuous form of the process, in which the ink is pressed at a uniform rate through a nozzle and the jet is directed onto the substrate by an electric field depending on the pattern to be printed, and there is an interrupted or drop-on-demand process, in which the ink is expelled only where a colored dot is to appear, the latter form of the process employing either a piezoelectric crystal or a heated hollow needle (bubble or thermal jet process) to exert pressure on the ink system and so eject an ink droplet. These techniques are described in Text. Chem. Color 19 (1987), No. 8, 23–29, and 21 (1989), No. 6, 27–32.

The colorant preparations of the invention are particularly useful as inks for the bubble jet process or the process employing a piezoelectric crystal.

If the print is to be fixed, this may be done in a known manner and as described in WO-A-99/01516 by, for example, applying a binder, if desired in the form of a dispersion or emulsion, to the printed substrate and curing the binder or laminating on a film.

However, the colorant preparations of the invention may also already contain the thermally or radiation-chemically curable binder, generally in an amount of from 2 to 20% by weight (reckoned on 100% solids).

Useful thermally curable binders include for example binders that are based on acrylates containing methylol groups and that crosslink by polycondensation in particular.

Preferred systems are mixtures of
from 1 to 10% by weight of N-methylol(meth)acrylamide or its $C_1$–$C_4$-alkyl ethers and if desired monomers containing halohydrin groups such as 2-hydroxy-3-chloropropylene acrylate and
from 90 to 99% by weight of comonomers, for example selected from the group consisting of butadiene, styrene, (meth)acrylic acid, (meth)acrylonitrile, (meth)acrylic and vinyl esters having up to 12 carbon atoms, vinyl chloride and N-vinylpyrrolidone as described for example in DE-A-16 19 656.

Acrylic acid derivatives containing methylol groups effect additional crosslinking under the action of acids or of compounds that detach protons on heating such as ammonium phosphates.

Useful thermally curable binders further include for example binders which are based on polyurethane prepolymers and which likewise crosslink by polycondensation.

Radiation-curable binders for the purposes of the present invention are binders which are curable by irradiation with high energy radiation, i.e., electromagnetic radiation especially from 220 to 450 nm (UV radiation) or electron beams. Suitable are not only free-radically but also cationically polymerizable binder components and also mixtures thereof.

Examples are acrylate, vinyl or epoxy monomers, prepolymers, polymers and mixtures thereof.

Further details concerning these binders are disclosed in WO-A-99/01516.

The colorant preparations of the invention may be printed on all types of substrate materials. Examples of substrate materials include

- coated or uncoated cellulosics such as paper, paperboard, cardboard, wood and woodbase,
- coated or uncoated metallic materials such as foils, sheets or workpieces composed of aluminum, iron, copper, silver, gold, zinc or alloys thereof,
- coated or uncoated silicatic materials such as glass, porcelain and ceramics,
- polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers such as gelatin,
- textile materials such as fibers, yarns, threads, knits, wovens, nonwovens and garments composed of polyester, modified polyester, polyester blend fabrics, cellulosics such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric,
- leather—both natural and artificial—in the form of smooth leather, nappa leather or suede leather,
- comestibles and cosmetics.

The substrate material may be sheetlike or three-dimensional in configuration and may be printed with the colorant preparations of the invention both uniformly and imagewise.

Colorant preparations according to the invention are useful ink-jet inks having altogether advantageous application properties, especially good start-of-print behavior and good sustained use behavior (cogation), and, especially when using the particularly preferred solvent combination (C), good drying behavior, and producing prints of high quality, i.e., brilliance and depth of shade, and also high rubfastness, lightfastness, waterfastness and wetrubfastness. They are particularly useful for printing coated and uncoated paper.

EXAMPLES

I) Production of Colorant Preparations According to the Invention

Example 1

15 g of C.I. Pigment Yellow 138, 5 g of 1,2-propylene glycol and 10 g of a dispersant (B2) based on an alkoxylated phenol (described as dispersant 13 in U.S. Pat. No. 4,218,218), 0.37 g of 50% strength by weight aqueous solution of glutaraldehyde and 0.75 g of 47% strength by weight aqueous solution of tetramethylolacetylenediurea were made up with completely ion-free water to a total weight of 100 g and predispersed in a dissolver. The pH was then adjusted to 8.5 with triethanolamine.

The mixture was subsequently ground at a circumferential speed of 10 m/s in a vertical stirred ball mill equipped with a double grinding disk using 660 g of yttrium-stabilized zirconium oxide beads (from 0.3 to 0.4 mm in diameter) until 99% of the pigment particles were less than 1 $\mu$m in size.

For final adjustment (4% strength by weight preparation), 37.5 g of millbase were admixed with 0.25 g of 50% strength by weight aqueous solution of glutaraldehyde, 0.22 g of 47% strength by weight aqueous solution of tetramethylolacetylenediurea, 10 g of triethylene glycol monobutyl ether and 10 g of Polytetrahydrofuran 250 (BASF) bulked with water to a total weight of 100 g, mixed and filtered through a sieve having a pore size of 1 $\mu$m.

Examples 2 to 106

The pigment preparations of Examples 2 to 71 and the disperse and solvent dye preparations of Examples 72 to 106, were produced similarly to Example 1. However, Examples 20 and 21 on the one hand and 22 and 23 on the other were carried out using a dispersant (B3) in the one case and (B3') in the other based on a reaction product of a triisocyanate with two compounds each containing one isocyanate-reactive group (Example 1 and Example 4, respectively, of DE-A-198 42 952).

Dispersant (B3)

A hot 35% strength by weight solution of polyethylene glycol monomethyl ether (MW 2000, 1 mol) in acetone at 50° C. was admixed with a commercially available trifunctional isocyanate (Basonate HB 100, BASF; 1 mol) and also dibutyltin dilaurate as catalyst. OH-monofunctionalized polyvinylpyrrolidone (PVP, K value about 17) was then added at a rate corresponding to the remaining isocyanate content. The reaction was continued until isocyanate groups were no longer detectable.

Dispersant (B3')

A hot 45% strength by weight solution of polyethylene glycol monomethyl ether (MW 2000, 1 mol) in acetone at 50° C. was admixed with a commercially available trifunctional isocyanate (Basonat® HB 100, BASF; 1 mol) and also dibutyltin dilaurate as catalyst. N,N-Bis(hydroxyethyl) aminomethyldiethyl phosphonate (Fyrol® 6, Akzo; about 2 mol; 50% strength by weight in tetrahydrofuran) was then added at a rate corresponding to the remaining isocyanate content. The reaction was continued until isocyanate groups were no longer detectable.

Examples 41 to 57 and 64 to 69 utilize a dispersant (B4) based on an ethoxylated β-hydroxynaphthalene ($M_W$ 27,000 g/mol).

Examples 70 and 71 utilize respectively dispersants B5 and B5' which are based on an initially propoxylated and then ethoxylated ethylenediamine and which are described respectively in Examples 4 and 2 of DE-A-31 51 753.

Examples 72 to 106 included a dispersant B1 which is based on an arylsulfonic acid-formaldehyde condensation product additionally containing benzoic acid and is described as dispersant 3 in U.S. Pat. No. 5,186,846.

Examples 58 to 69 additionally utilized a commercially available thermally curable textile binder based on acrylate-styrene copolymer.

Further particulars relating to the pigment preparations obtained are shown in Table 1a, 1b and 1c. Percentages are by weight.

Key:

Biocide A: 50% aqueous solution of glutardialdehyde

Biocide B: 4% aqueous solution of tetramethylolacetylenediurea

Biocide C: 20% solution of 1,2-benzisothiazolin-3-one in aqueous ethylene glycol Biocide D: 10% solution of 1,2-benzisothiazolin-3-one in aqueous propylene glycol Wetting agent: 2-(3-Hydroxypropyl)heptamethyltrisiloxane, first ethoxylated and then propoxylated (11 mol EO/5 mol PO)

TABLE 1a

|  | Preparation No. | | | | | | |
| --- | --- | --- | --- | --- | --- | --- | --- |
|  | 1 | 2 | 3 | 4 | 5 | 6 | 7 |
| C.I. Pigment Yellow 138 | 4% | | | | | | 5% |
| C.I. Pigment Red 122 | | | | | | 2.5% | |
| C.I. Pigment Blue 15:3 | | | | | 1% | | |
| C.I. Pigment Blue 15:4 | | 2% | | | | | |
| C.I. Pigment Black 7 | | | | 5% | | | |
| C.I. Pigment Green 7 | | | | | | | |
| C.I. Pigment Violet 19 | | | 2% | | | | |
| Dispersant | 2.67% | 2% | 2% | 2.5% | 0.5% | 1.25% | 2.5% |
|  | B2 | B2 | B2 | B2 | B2 | B2 | B2 |
| Polytetrahydrofuran 250 | 10% | | | 2% | 2% | 2% | 2% |
| N-(2-Hydroxyethyl)pyrrolidone | | | | | | | |
| 1,2-Propylene glycol | 1.33% | 0.67% | 0.67% | 5% | 5% | 5% | 6.7% |
| Diethylene glycol | | | | 8% | 8% | 8% | 3% |
| Triethylene glycol monobutyl ether | 10% | 10% | 10% | 2% | 2% | 2% | 6% |
| Diethylene glycol monobutyl ether | | | | 3% | | | |
| Polyethylene glycol ($\overline{MW}$ 400) | | | | | | | |
| Biocide A | 0.4% | 0.4% | 0.4% | | | | |
| Biocide B | 0.5% | 0.5% | 0.5% | | | | |
| Completely ion-free water | 71.1% | 86.43% | 84.43% | 72.5% | 81.5% | 79.25% | 74.8% |
| Total | 100% | 100% | 100% | 100% | 100% | 100% | 100% |

|  | Preparation No. | | | | | | |
| --- | --- | --- | --- | --- | --- | --- | --- |
|  | 8 | 9 | 10 | 11 | 12 | 13 | 14 |
| C.I. Pigment Yellow 138 | | | 4% | 4% | | | |
| C.I. Pigment Red 122 | | | | | | | |
| C.I. Pigment Blue 15:3 | | 4% | | | | 4% | 4% |
| C.I. Pigment Blue 15:4 | | | | | | | |
| C.I. Pigment Black 7 | 4% | | | | 4% | | |
| C.I. Pigment Green 7 | | | | | | | |
| C.I. Pigment Violet 19 | | | | | | | |
| Dispersant | 2% | 2% | 2% | 2% | 2% | 2% | 2% |
|  | B2 | B2 | B2 | B2 | B2 | B2 | B2 |
| Polytetrahydrofuran 250 | 5% | 5% | 5% | 5% | 5% | 5% | 20% |
| N-(2-Hydroxyethyl)pyrrolidone | | | | | | | |
| 1,2-Propylene glycol | | | | 15% | 15% | 15% | |
| Diethylene glycol | 15% | 15% | 15% | | | | |
| Triethylene glycol monobutyl ether | | | | | | | |
| Diethylene glycol monobutyl ether | | | | | | | |
| Polyethylene glycol ($\overline{MW}$ 400) | | | | | | | |
| Biocide A | | | | | | | |
| Biocide B | | | | | | | |
| Completely ion-free water | 74% | 74% | 74% | 74% | 74% | 74% | 74% |
| Total | 100% | 100% | 100% | 100% | 100% | 100% | 100% |

|  | Preparation No. | | | | | | | | |
| --- | --- | --- | --- | --- | --- | --- | --- | --- | --- |
|  | 15 | 16 | 17 | 18 | 19 | 20 | 21 | 22 | 23 |
| C.I. Pigment Yellow 138 | | | | | | | | | |
| C.I. Pigment Red 122 | | | | | 2.5% | | | | |
| C.I. Pigment Blue 15:3 | | | | | | 4% | 4% | 1.5% | 1.5% |
| C.I. Pigment Blue 15:4 | | | | | | | | | |
| C.I. Pigment Black 7 | 5% | 5% | 5% | 5% | | | | | |
| C.I. Pigment Green 7 | | | | | | | | | |
| C.I. Pigment Violet 19 | | | | | | | | | |
| Dispersant | 2.5% | 2.5% | 2.5% | 2.5% | 1.25% | 4% | 4% | 1.5% | 1.5% |
|  | B2 | B2 | B2 | B2 | B2 | B3 | B3' | B3 | B3' |
| Polytetrahydrofuran 250 | 10% | 5% | 5% | 10% | 10% | 10% | 10% | 10% | 10% |
| N-(2-Hydroxyethyl)pyrrolidone | | | 5% | 10% | | | | | |

TABLE 1a-continued

| | | | | | | | | | |
|---|---|---|---|---|---|---|---|---|---|
| 1,2-Propylene glycol | | | 5% | | | | | | |
| Diethylene glycol | | | | | | | | | |
| Triethylene glycol monobutyl ether | | | | | | 10% | 10% | 10% | 10% |
| Diethylene glycol monobutyl ether | | | | | | | | | |
| Polyethylene glycol ($\overline{MW}$ 400) | | | | | | 0.6% | 0.6% | 0.23% | 0.23% |
| Biocide A | | | | | | 0.4% | 0.4% | 0.4% | 0.4% |
| Biocide B | | | | | | 0.5% | 0.5% | 0.5% | 0.5% |
| Completely ion-free water | 82.5% | 82.5% | 82.5% | 72.5% | 86.25% | 70.5% | 70.5% | 75.87% | 75.87% |
| Total | 100% | 100% | 100% | 100% | 100% | 100% | 100% | 100% | 100% |

TABLE 1b

| | Preparation No. | | | | | | | |
|---|---|---|---|---|---|---|---|---|
| | 24 | 25 | 26 | 27 | 28 | 29 | 30 | 31 |
| C.I. Pigment Yellow 138 | 4% | | | | | | 4.5% | |
| C.I. Pigment Red 122 | | 2.5% | | | | | | 2.5% |
| C.I. Pigment Blue 15:4 | | | 2% | | | | | |
| C.I. Pigment Blue 15:3 | | | | | | | | |
| C.I. Pigment Orange 43 | | | | 2.5% | | | | |
| C.I. Pigment Green 7 | | | | | 2.5% | | | |
| C.I. Pigment Red 146 | | | | | | 3% | | |
| C.I. Pigment Black 7 | | | | | | | | |
| Dispersant | 2% | 2.5% | 2% | 2.5% | 2.5% | 3% | 2.25% | 2.5 |
| | B1 | B1 | B1 | B1 | B1 | B1 | B1 | B1 |
| Polytetrahydrofuran 250 | 6% | 6% | 6% | 6% | 6% | 6% | 6% | 6% |
| Glycerol | 6% | 6% | 6% | 6% | 6% | 6% | 4% | 4% |
| 1,2-Propylene glycol | 1.33% | 0.83% | 0.67% | 0.83% | 0.83% | 1% | 1.5% | 0.83% |
| Triethylene glycol monobutyl ether | 3% | 3% | 3% | 3% | 3% | 3% | 5% | 5% |
| Polyethylene glycol ($\overline{MW}$ 400) | 5% | 5% | 5% | 5% | 5% | 5% | 5% | 5% |
| Urea | 1% | 1% | 1% | 1% | 1% | 1% | 1% | 1% |
| Wetting agent | 0.5% | 0.5% | 0.5% | 0.5% | 0.5% | 0.5% | 0.5% | |
| Triethanolamine | 0.4% | | | | | | 0.045% | |
| Biocide A | | | | | | | | 0.1% |
| Biocide B | | | | | | | | 0.12% |
| Biocide C | 0.2% | 0.12% | 0.1% | 0.12% | 0.12% | 0.15% | 0.225% | |
| Biocide D | | | | | | | | |
| Binder | | | | | | | | |
| Completely ion-free water | 70.93% | 72.55% | 73.73% | 72.55% | 72.55% | 71.35% | 70.48% | 72.95% |
| Total | 100% | 100% | 100% | 100% | 100% | 100% | 100% | 100% |

| | Preparation No. | | | | | | | |
|---|---|---|---|---|---|---|---|---|
| | 32 | 33 | 34 | 35 | 36 | 37 | 38 | 39 |
| C.I. Pigment Yellow 138 | | | 1.6% | 2.5% | | | | |
| C.I. Pigment Red 122 | | | | | 2% | | | |
| C.I. Pigment Blue 15:4 | 2% | | | | | 1.5% | | |
| C.I. Pigment Blue 15:3 | | 2% | | | | | | |
| C.I. Pigment Orange 43 | | | | | | | 2% | |
| C.I. Pigment Green 7 | | | | | | | | 2% |
| C.I. Pigment Red 146 | | | | | | | | |
| C.I. Pigment Black 7 | | | | | | | | |
| Dispersant | 2% | 2% | 0.8% | 1.25% | 2% | 1.5% | 2% | 2% |
| | B1 | B1 | B1 | B1 | B1 | B1 | B1 | B1 |
| Polytetrahydrofuran 250 | 6% | 6% | 6% | 6% | 6% | 6% | 6% | 6% |
| Glycerol | 4% | 4% | 4% | 4% | 4% | 4% | 4% | 4% |
| 1,2-Propylene glycol | 0.67% | 0.67% | 0.53% | 0.83% | 0.67% | 0.5% | 0.67% | 0.67% |
| Triethylene glycol monobutyl ether | 5% | 5% | 5% | 5% | 5% | 5% | 5% | 5% |
| Polyethylene glycol ($\overline{MW}$ 400) | 5% | 5% | 5% | 5% | 5% | 5% | 5% | 5% |
| Urea | 1% | 1% | 1% | 1% | 1% | 1% | 1% | |
| Wetting agent | | | 0.5% | 0.5% | 0.5% | 0.5% | 0.5% | 0.5% |
| Triethanolamine | | | 0.016% | 0.025% | | | | |
| Biocide A | 0.08% | 0.08% | | | | | | |
| Biocide B | 0.1% | 0.1% | | | | | | |
| Biocide C | | | 0.08% | 0.125% | 0.1% | 0.07% | | 0.1% |
| Biocide D | | | | | | | 0.1% | |
| Binder | | | | | | | | |
| Completely ion-free water | 74.15% | 74.15 | 75.474% | 73.77% | 73.73% | 74.93% | 73.73% | 73.73% |
| Total | 100% | 100% | 100% | 100% | 100% | 100% | 100% | 100% |

TABLE 1b-continued

|  | Preparation No. | | | | | | | |
|---|---|---|---|---|---|---|---|---|
|  | 40 | 41 | 42 | 43 | 44 | 45 | 46 | 47 |
| C.I. Pigment Yellow 138 |  | 4% |  |  |  |  |  | 4.5% |
| C.I. Pigment Red 122 |  |  | 2.5% |  |  |  |  |  |
| C.I. Pigment Blue 15:4 |  |  |  | 2% |  |  |  |  |
| C.I. Pigment Blue 15:3 |  |  |  |  |  |  |  |  |
| C.I. Pigment Orange 43 | 2% |  |  |  | 2.5% |  |  |  |
| C.I. Pigment Green 7 |  |  |  |  |  | 2.5% |  |  |
| C.I. Pigment Red 146 |  |  |  |  |  |  | 3% |  |
| C.I. Pigment Black 7 |  |  |  |  |  |  |  |  |
| Dispersant | 2% | 2% | 2.5% | 2% | 2.5% | 2.5% | 3% | 2.25% |
|  | B1 | B4 | B4 | B4 | B4 | B4 | B4 | B4 |
| Polytetrahydrofuran 250 | 6% | 6% | 6% | 6% | 6% | 6% | 6% | 6% |
| Glycerol | 4% | 6% | 6% | 6% | 6% | 6% | 6% | 4% |
| 1,2-Propylene glycol | 0.67% | 1.33% | 0.83% | 0.67% | 0.83% | 0.83% | 1% | 1.5% |
| Triethylene glycol monobutyl ether | 5% | 3% | 3% | 3% | 3% | 3% | 3% | 5% |
| Polyethylene glycol ($\overline{MW}$ 400) | 5% | 5% | 5% | 5% | 5% | 5% | 5% | 5% |
| Urea | 1% | 1% | 1% | 1% | 1% | 1% | 1% | 1% |
| Wetting agent | 0.5% | 0.5% | 0.5% | 0.5% | 0.5% | 0.5% | 0.5% |  |
| Triethanolamine |  | 0.04% |  |  |  |  |  | 0.045% |
| Biocide A |  |  |  |  |  |  |  |  |
| Biocide B |  |  |  |  |  |  |  |  |
| Biocide C |  | 0.2% | 0.12% | 0.1% | 0.12% | 0.12% | 0.15% | 0.225% |
| Biocide D | 0.1% |  |  |  |  |  |  |  |
| Binder |  |  |  |  |  |  |  |  |
| Completely ion-free water | 73.73% | 70.93% | 72.55% | 73.73% | 72.55% | 72.55% | 71.35% | 70.48% |
| Total | 100% | 100% | 100% | 100% | 100% | 100% | 100% | 100% |

|  | Preparation No. | | | | | | | |
|---|---|---|---|---|---|---|---|---|
|  | 48 | 49 | 50 | 51 | 52 | 53 | 54 | 55 |
| C.I. Pigment Yellow 138 |  |  |  | 1.6% | 2.5% |  |  |  |
| C.I. Pigment Red 122 | 2.5% |  |  |  |  | 2% |  |  |
| C.I. Pigment Blue 15:4 |  | 2% |  |  |  |  | 1.5% |  |
| C.I. Pigment Blue 15:3 |  |  | 2% |  |  |  |  |  |
| C.I. Pigment Orange 43 |  |  |  |  |  |  |  | 2% |
| C.I. Pigment Green 7 |  |  |  |  |  |  |  |  |
| C.I. Pigment Red 146 |  |  |  |  |  |  |  |  |
| C.I. Pigment Black 7 |  |  |  |  |  |  |  |  |
| Dispersant | 2.5% | 2% | 2% | 0.8% | 1.25% | 2% | 1.5% | 2% |
|  | B4 | B4 | B4 | B4 | B4 | B4 | B4 | B4 |
| Polytetrahydrofuran 250 | 6% | 6% | 6% | 6% | 6% | 6% | 6% | 6% |
| Glycerol | 4% | 4% | 4% | 4% | 4% | 4% | 4% | 4% |
| 1,2-Propylene glycol | 0.83% | 0.67% | 0.67% | 0.83% | 0.83% | 0.67% | 0.5% | 0.67% |
| Triethylene glycol monobutyl ether | 5% | 5% | 5% | 5% | 5% | 5% | 5% | 5% |
| Polyethylene glycol ($\overline{MW}$ 400) | 5% | 5% | 5% | 5% | 5% | 5% | 5% | 5% |
| Urea | 1% | 1% | 1% | 1% | 1% | 1% | 1% | 1% |
| Wetting agent |  |  |  | 0.5% | 0.5% | 0.5% | 0.5% | 0.5% |
| Triethanolamine |  |  |  | 0.016% | 0.025% |  |  | 0.08% |
| Biocide A | 0.1% | 0.08% | 0.08% |  |  |  |  |  |
| Biocide B | 0.12% | 0.1% | 0.1% |  |  |  |  | 0.1% |
| Biocide C |  |  |  | 0.08% | 0.125% | 0.1% | 0.07% |  |
| Biocide D |  |  |  |  |  |  |  | 0.1% |
| Binder |  |  |  |  |  |  |  |  |
| Completely ion-free water | 72.95% | 74.15% | 74.15% | 75.474% | 73.77% | 73.73% | 74.93 | 73.73% |
| Total | 100% | 100% | 100% | 100% | 100% | 100% | 100% | 100% |

|  | Preparation No. | | | | | | | |
|---|---|---|---|---|---|---|---|---|
|  | 56 | 57 | 58 | 59 | 60 | 61 | 62 | 63 |
| C.I. Pigment Yellow 138 |  |  | 4% |  |  |  |  |  |
| C.I. Pigment Red 122 |  |  |  | 2.5% |  |  |  |  |
| C.I. Pigment Blue 15:4 |  |  |  |  | 2% |  |  |  |
| C.I. Pigment Blue 15:3 |  |  |  |  |  |  |  |  |
| C.I. Pigment Orange 43 |  |  |  |  |  | 2.5% |  |  |
| C.I. Pigment Green 7 | 2% |  |  |  |  |  | 2.5% |  |
| C.I. Pigment Red 146 |  | 2% |  |  |  |  |  | 3% |
| C.I. Pigment Black 7 |  |  |  |  |  |  |  |  |
| Dispersant | 2% | 2% | 2% | 2.5% | 2% | 2.5% | 2.5% | 3% |
|  | B4 | B4 | B1 | B1 | B1 | B1 | B1 | B1 |
| Polytetrahydrofuran 250 | 6% | 6% | 6% | 6% | 6% | 6% | 6% | 6% |
| Glycerol | 4% | 4% | 6% | 6% | 6% | 6% | 6% | 6% |
| 1,2-Propylene glycol | 0.67% | 0.67% | 1.33% | 0.83% | 0.67% | 0.83% | 0.83% | 1% |

TABLE 1b-continued

| | | | | | | | | |
|---|---|---|---|---|---|---|---|---|
| Triethylene glycol monobutyl ether | 5% | 5% | 3% | 3% | 3% | 3% | 3% | 3% |
| Polyethylene glycol ($\overline{MW}$ 400) | 5% | 5% | 5% | 5% | 5% | 5% | 5% | 5% |
| Urea | 1% | 1% | 1% | 1% | 1% | 1% | 1% | 1% |
| Wetting agent | 0.5% | 0.5% | 0.5% | 0.5% | 0.5% | 0.5% | 0.5% | 0.5% |
| Triethanolamine | | | 0.04% | | | | | |
| Biocide A | | 0.08% | | | | | | |
| Biocide B | | 0.1% | | | | | | |
| Biocide C | 0.1% | | 0.2% | 0.12% | 0.1% | 0.12% | 0.12% | 0.15% |
| Biocide D | | 0.1% | | | | | | |
| Binder | | | 15% | 15% | 15% | 15% | 15% | 15% |
| Completely ion-free water | 73.73% | 73.73% | 55.93% | 57.55% | 58.73% | 57.55% | 57.55% | 56.35% |
| Total | 100% | 100% | 100% | 100% | 100% | 100% | 100% | 100% |

| | Preparation No. | | | | | | | |
|---|---|---|---|---|---|---|---|---|
| | 64 | 65 | 66 | 67 | 68 | 69 | 70 | 71 |
| C.I. Pigment Yellow 138 | 4% | | | | | | | |
| C.I. Pigment Red 122 | | 2.5% | | | | | | |
| C.I. Pigment Blue 15:4 | | | 2% | | | | 4% | |
| C.I. Pigment Blue 15:3 | | | | | | | | |
| C.I. Pigment Orange 43 | | | | 2.5% | | | | |
| C.I. Pigment Green 7 | | | | | 2.5% | | | |
| C.I. Pigment Red 146 | | | | | | 3% | | |
| C.I. Pigment Black 7 | | | | | | | | 4% |
| Dispersant | 2% | 2.5% | 2% | 2.5% | 2.5% | 3% | 4% | 4% |
| | B4 | B4 | B4 | B4 | B4 | B4 | B5 | B5' |
| Polytetrahydrofuran 250 | 6% | 6% | 6% | 6% | 6% | 6% | 10% | 10% |
| Glycerol | 6% | 6% | 6% | 6% | 6% | 6% | | |
| 1,2-Propylene glycol | 1.33% | 0.83% | 0.67% | 0.83% | 0.83% | 1% | 1.33% | 1.33% |
| Triethylene glycol monobutyl ether | 3% | 3% | 3% | 3% | 3% | 3% | 10% | 10% |
| Polyethylene glycol ($\overline{MW}$ 400) | 5% | 5% | 5% | 5% | 5% | 5% | | |
| Urea | 1% | 1% | 1% | 1% | 1% | 1% | | |
| Wetting agent | 0.5% | 0.5% | 0.5% | 0.5% | 0.5% | 0.5% | | |
| Triethanolamine | 0.04% | | | | | | | |
| Biocide A | | | | | | | 0.4% | 0.4% |
| Biocide B | | | | | | | 0.5% | 0.5% |
| Biocide C | 0.2% | 0.12% | 0.1% | 0.12% | 0.12% | 0.15% | | |
| Biocide D | | | | | | | | |
| Binder | 15% | 15% | 15% | 15% | 15% | 15% | | |
| Completely ion-free water | 55.93% | 57.55% | 59.73% | 57.55% | 57.55% | 56.35% | 79.77% | 79.77% |
| Total | 100% | 100% | 100% | 100% | 100% | 100% | 100% | 100% |

TABLE 1c

| | Preparation No. | | | | | | | |
|---|---|---|---|---|---|---|---|---|
| | 72 | 73 | 74 | 75 | 76 | 77 | 78 | 79 |
| C.I. Disperse Yellow 54 | 3% | | 0.925% | | | | | |
| C.I. Disperse Yellow 86 | | | | | | | | |
| C.I. Disperse Red 60 | | 3% | 0.925% | 2.7% | 2.7% | 2.7% | 2.7% | 2.7% |
| C.I. Disperse Red 11 | | | | | | | | |
| C.I. Disperse Red 86 | | | 3.75% | | | | | |
| C.I. Disperse Red 127 | | | | | | | | |
| C.I. Disperse Blue 72 | | | | | | | | |
| C.I. Disperse Blue 359 | | | | | | | | |
| C.I. Disperse Blue 332 | | | | | | | | |
| C.I. Disperse Blue 60 | | | | | | | | |
| C.I. Disperse Blue 77 | | | | | | | | |
| C.I. Solvent Yellow 163 | | | | | | | | |
| Dispersant | 1.5% | 3% | 3.26% | 2.7% | 2.7% | 2.7% | 2.7% | 2.7% |
| | B1 | B1 | B1 | B1 | B1 | B1 | B1 | B1 |
| Polytetrahydrofuran 250 | 3% | 5.5% | 5% | 5% | 3% | 5% | 4% | 6% |
| Glycerol | 20% | 20% | 13% | 14% | 14% | 12% | 11% | 6% |
| Sorbitol | | | | | | | | |
| Triethylene glycol monobutyl ether | | | | | | | | 3% |
| Polyethylene glycol ($\overline{MW}$ 400) | 5% | 5% | | | 2% | 2% | 4% | 4% |
| Urea | | | | 1% | 1% | 1% | 1% | 1% |
| Wetting agent | 0.08% | 0.1% | 0.15% | 0.2% | 0.2% | 0.2% | 0.2% | 0.2% |

TABLE 1c-continued

| | | | | | | | | |
|---|---|---|---|---|---|---|---|---|
| Biocide D | 0.5% | 0.5% | 0.5% | 0.5% | 0.5% | 0.5% | 0.5% | 0.5% |
| Completely ion-free water | 66.92% | 62.9% | 72.49% | 73.9% | 73.9% | 73.9% | 73.9% | 73.9% |
| Total | 100% | 100% | 100% | 100% | 100% | 100% | 100% | 100% |

| | Preparation No. | | | | | | | |
|---|---|---|---|---|---|---|---|---|
| | 80 | 81 | 82 | 83 | 84 | 85 | 86 | 87 |
| C.I. Disperse Yellow 54 | | | | | | | | |
| C.I. Disperse Yellow 86 | | | | | | | | |
| C.I. Disperse Red 60 | 2.7% | 2.7% | 2.7% | 2.7% | 2.7% | | | |
| C.I. Disperse Red 11 | | | | | | 2% | 2% | 2% |
| C.I. Disperse Red 86 | | | | | | | | |
| C.I. Disperse Red 127 | | | | | | | | |
| C.I. Disperse Blue 72 | | | | | | | | |
| C.I. Disperse Blue 359 | | | | | | | | |
| C.I. Disperse Blue 332 | | | | | | | | |
| C.I. Disperse Blue 60 | | | | | | | | |
| C.I. Disperse Blue 77 | | | | | | | | |
| C.I. Solvent Yellow 163 | | | | | | | | |
| Dispersant | 2.7% | 2.7% | 2.7% | 2.7% | 2.7 | 2% | 2% | 2% |
| | B1 | B1 | B1 | B1 | B1 | B1 | B1 | B1 |
| Polytetrahydrofuran 250 | 3% | 5% | 5% | 4% | 6% | 5% | 3% | 5% |
| Glycerol | | | | | | | | |
| Sorbitol | 14% | 14% | 12% | 11% | 6% | 14% | 14% | 12% |
| Triethylene glycol monobutyl ether | | | | | 3% | | | |
| Polyethylene glycol ($\overline{MW}$ 400) | 2% | | 2% | 4% | 4% | | 2% | 2% |
| Urea | 1% | 1% | 1% | 1% | 1% | 1% | 1% | 1% |
| Wetting agent | 0.1% | 0.3% | 0.1% | 0.1% | 0.1% | 0.1% | 0.1% | 0.1% |
| Biocide D | 0.5% | 0.5% | 0.5% | 0.5% | 0.5% | 0.5% | 0.5% | 0.5% |
| Completely ion-free water | 74% | 74% | 74% | 74% | 74% | 75.4% | 75.4% | 75.4% |
| Total | 100% | 100% | 100% | 100% | 100% | 100% | 100% | 100% |

| | Preparation No. | | | | | | | |
|---|---|---|---|---|---|---|---|---|
| | 88 | 89 | 90 | 91 | 92 | 93 | 94 | 95 |
| C.I. Disperse Yellow 54 | | | | | | | | |
| C.I. Disperse Yellow 86 | | | | | | | | |
| C.I. Disperse Red 60 | | | | | | | | |
| C.I. Disperse Red 11 | 2% | 2% | | | | | | |
| C.I. Disperse Red 86 | | | | | | | | |
| C.I. Disperse Red 127 | | | | | | | | |
| C.I. Disperse Blue 72 | | | 2.7% | | | | | |
| C.I. Disperse Blue 359 | | | | 3% | 3% | | | |
| C.I. Disperse Blue 332 | | | | | | 2% | 2% | |
| C.I. Disperse Blue 60 | | | | | | | | |
| C.I. Disperse Blue 77 | | | | | | | | |
| C.I. Solvent Yellow 163 | | | | | | | | 5% |
| Dispersant | 2% | 2% | 1.35% | 1.5% | 1.5% | 1% | 1% | 2.5% |
| | B1 | B1 | B1 | B1 | B1 | B1 | B1 | B1 |
| Polytetrahydrofuran 250 | 4% | 6% | 3% | 3% | 3% | 3% | 3% | 3% |
| Glycerol | 14% | 12% | | | 14% | | 14% | |
| Sorbitol | | | 14% | 14% | | 14% | | 14% |
| Triethylene glycol monobutyl ether | | 3% | | | | | | |
| Polyethylene glycol ($\overline{MW}$ 400) | 4% | 4% | 2% | 2% | 2% | 2% | 2% | 2% |
| Urea | 1% | 1% | 1% | 1% | 1% | 1% | 1% | 1% |
| Wetting agent | 0.1% | 0.1% | 0.1% | 0.1% | 0.1% | 0.1% | 0.1% | 0.1% |
| Biocide D | 0.5% | 0.5% | 0.5% | 0.5% | 0.5% | 0.5% | 0.5% | 0.5% |
| Completely ion-free water | 72.4% | 69.4% | 75.35% | 74.9% | 74.9% | 74.9% | 74.9% | 71.9% |
| Total | 100% | 100% | 100% | 100% | 100% | 100% | 100% | 100% |

| | Preparation No. | | | | | | | |
|---|---|---|---|---|---|---|---|---|
| | 96 | 97 | 98 | 99 | 100 | 101 | 102 | 103 |
| C.I. Disperse Yellow 54 | | | | | | | | |
| C.I. Disperse Yellow 86 | | | | 5% | | | | |
| C.I. Disperse Red 60 | | | | | | | | |
| C.I. Disperse Red 11 | | | | | | | | |
| C.I. Disperse Red 86 | | | 5% | | | | | |
| C.I. Disperse Red 127 | | | | | 5% | | | |
| C.I. Disperse Blue 72 | | | | | | | | |
| C.I. Disperse Blue 359 | | | | | | | | |
| C.I. Disperse Blue 332 | | | | | | | | |
| C.I. Disperse Blue 60 | 5% | | | | | | 5% | |

TABLE 1c-continued

|  | | | | | | | | |
|---|---|---|---|---|---|---|---|---|
| C.I. Disperse Blue 77 | 5% | | | | | | | 5% |
| C.I. Solvent Yellow 163 | | | | | | 5% | | |
| Dispersant | 2.5% B1 | 2.5% B1 | 2.5% B1 | 2.5% B1 | 2.5% B1 | 2.5% B1 | 2.5% B1 | 2.5% B1 |
| Polytetrahydrofuran 250 | 3% | 3% | 3% | 3% | 3% | 3% | 3% | 3% |
| Glycerol | | | | | | 14% | 14% | 14% |
| Sorbitol | 14% | 14% | 14% | 14% | 14% | | | |
| Triethylene glycol monobutyl ether | | | | | | | | |
| Polyethylene glycol ($\overline{MW}$ 400) | 2% | 2% | 2% | 2% | 2% | 2% | 2% | 2% |
| Urea | 1% | 1% | 1% | 1% | 1% | 1% | 1% | 1% |
| Wetting agent | 0.1% | 0.1 | 0.1% | 0.1% | 0.1% | 0.1% | 0.1% | 0.1% |
| Biocide D | 0.5% | 0.5% | 0.5% | 0.5% | 0.5% | 0.5% | 0.5% | 0.5% |
| Completely ion-free water | 71.9% | 71.9% | 71.9% | 71.9% | 71.9% | 71.9% | 71.9% | 71.9% |
| Total | 100% | 100% | 100% | 100% | 100% | 100% | 100% | 100% |

| | Preparation No. | | |
|---|---|---|---|
| | 104 | 105 | 106 |
| C.I. Disperse Yellow 54 | | | |
| C.I. Disperse Yellow 86 | | 5% | |
| C.I. Disperse Red 60 | | | |
| C.I. Disperse Red 11 | | | |
| C.I. Disperse Red 86 | 5% | | |
| C.I. Disperse Red 127 | | | 5% |
| C.I. Disperse Blue 72 | | | |
| C.I. Disperse Blue 359 | | | |
| C.I. Disperse Blue 332 | | | |
| C.I. Disperse Blue 60 | | | |
| C.I. Disperse Blue 77 | | | |
| C.I. Solvent Yellow 163 | | | |
| Dispersant | 2.5% B1 | 2.5% B1 | 2.5% B1 |
| Polytetrahydrofuran 250 | 3% | 3% | 3% |
| Glycerol | 14% | 14% | 14% |
| Sorbitol | | | |
| Triethylene glycol monobutyl ether | | | |
| Polyethylene glycol ($\overline{MW}$ 400) | 2% | 2% | 2% |
| Urea | 1% | 1% | 1% |
| Wetting agent | 0.1% | 0.1% | 0.1% |
| Biocide D | 0.5% | 0.5% | 0.5% |
| Completely ion-free water | 71.9% | 71.9% | 71.9% |
| Total | 100% | 100% | 100% |

Example 107

2.5 g of an 80% strength by weight water-moist presscake of the dye of the formula VII

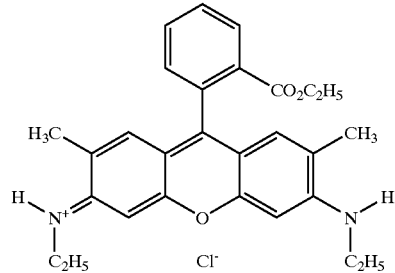

(VII)

were dissolved in 87.5 g of water with stirring and ultrafiltered using an MX 07 filter from Osmonics. Following addition of 8 g of 1,2-propylene glycol and 2 g of Polytetrahydrofuran 250, the mixture was filtered using a KS 80 filter from Seitz to remove suspended solids.

Examples 108 to 123

The dye preparations of Examples 108 to 123 were produced similarly to Example 107.

Further particulars relating to the dye preparations obtained are shown in Table 2. Percentages are by weight.

TABLE 2

| | Preparation No. | | | | | | | |
|---|---|---|---|---|---|---|---|---|
| | 107 | 108 | 109 | 110 | 111 | 112 | 113 | 114 |
| Dye of formula (VII) | 2% | 2% | 2% | | | | | |
| C.I. Reactive Blue 72 | | | | 2% | 2% | 2% | | |
| C.I. Acid Yellow 5 | | | | | | | 3% | 3% |

TABLE 2-continued

| | Preparation No. | | | | | | | |
|---|---|---|---|---|---|---|---|---|
| | | | | | | | | |
| C.I. Reactive Red 187 | | | | | | | | |
| C.I. Acid Red 87 | | | | | | | | |
| C.I. Reactive Red 120 | | | | | | | | |
| Polytetrahydrofuran 250 | 2% | 2% | 2% | 2% | 2% | 2% | 2% | 2% |
| N-(2-Hydroxyethyl)pyrrolidone | | | 8% | | | 8% | | |
| 1,2-Propylene glycol | 8% | | | 8% | | | 8% | |
| Diethylene glycol | | 8% | | | 8% | | | 8% |
| Completely ion-free water | 88% | 88% | 88% | 88% | 88% | 88% | 87% | 87% |
| Total | 100% | 100% | 100% | 100% | 100% | 100% | 100% | 100% |

| | Preparation No. | | | | | | | | |
|---|---|---|---|---|---|---|---|---|---|
| | 115 | 116 | 117 | 118 | 119 | 120 | 121 | 122 | 123 |
| Dye of formula (VII) | | | | | | | | | |
| C.I. Reactive Blue 72 | | | | | | | | | |
| C.I. Acid Yellow 5 | 3% | | | | | | | | |
| C.I. Reactive Red 187 | | 2% | 2% | | | | | | |
| C.I. Acid Red 87 | | | | 2% | 2% | 2% | | | |
| C.I. Reactive Red 120 | | | | | | | 4% | 4% | 4% |
| Polytetrahydrofuran 250 | 2% | 2% | 2% | 2% | 2% | 2% | 2% | 2% | 2% |
| N-(2-Hydroxyethyl)pyrrolidone | 8% | | 8% | | 8% | | | | 8% |
| 1,2-Propylene glycol | | | | 8% | | | 8% | | |
| Diethylene glycol | | 8% | | | | 8% | | 8% | |
| Completely ion-free water | 87% | 88% | 88% | 88% | 88% | 88% | 86% | 86% | 86% |
| Total | 100% | 100% | 100% | 100% | 100% | 100% | 100% | 100% | 100% |

II) Testing of Colorant Preparations According to Invention

On being printed up on commercially available ink-jet printers on coated as well as uncoated paper, all colorant preparations showed excellent start-of-print and sustained use behavior and produced prints of high brilliance.

The physical and printing properties investigated in the case of Examples 24 to 57 and 72 to 80 are collated in Table 3:

1) Surface Tension

The surface tension was determined using a Krüss K10 digital tensiometer. The values reported in Table 3 are the averages of 3 measurements.

2) Viscosity

The kinetic viscosity was determined by the Ubbelohde method (DIN 51662) at 25° C. (20° C. in the case of Examples 72 to 74).

3) pH pH was determined with a Knick 763 pH meter.

Printing properties were tested on a Mimaki JV2/130 ink-jet printer.

4) Start-of-print

Start-of-print behavior was scored as follows:

1: After 72 h printer prints with all nozzles.

2: After 72 h printer prints with all nozzles after cleaning.

3: After 72 h printer prints with all nozzles after repeated cleaning.

4: After 72 h one or more nozzles are irreversibly clogged.

5) Sustained Use

Sustained use behavior was scored as follows:

1: 100 pages of A4 format are printed with all nozzles without cleaning.

2: 100 pages of A4 format are printed with at most 4 missing (clogged) nozzles without cleaning.

3: 100 pages of A4 format are printed with all nozzles with intermediate cleaning.

4: Fewer than 100 pages of A4 format are printed with all nozzles with intermediate cleaning.

6) Drying

Drying behavior was scored visually during printing on a commercially available Premium Ink Jet Paper (basis weight 140 g/m$^2$; from Cham Tenero) as follows:

1: Print is dry without drying unit during the printing of 10 lines.

2: Print is dry without drying means during windup.

3: Print is dry with drying means during windup.

4: Print is not dry during windup despite drying means.

TABLE 3

| Prep. No. | Surface tension [mN/m] | Viscosity [mm$^2$/s] | pH | Start of print rating | Sustained use rating | Drying behavior rating |
|---|---|---|---|---|---|---|
| 24 | 30.8 | 3.16 | 7.5 | 1 | 1 | 1 |
| 25 | 28.8 | 2.94 | 8.6 | 1 | 1 | 1 |
| 26 | 28.3 | 2.96 | 8.2 | 1 | 1 | 1 |
| 27 | 27.8 | 3.12 | 7.6 | 1 | 1 | 1 |
| 28 | 29.5 | 2.98 | 8.0 | 1 | 1 | 1 |
| 29 | 29.4 | 3.68 | 8.0 | 1 | 1 | 1 |
| 30 | 41.9 | 3.50 | 7.6 | 2 | 1 | 1 |
| 31 | 42.8 | 3.20 | 6.4 | 2 | 1 | 1 |
| 32 | 42.9 | 3.17 | 7.3 | 1 | 1 | 1 |
| 33 | 42.9 | 3.17 | 7.3 | 1 | 1 | 1 |
| 34 | 23.0 | 2.53 | 7.3 | 1 | 1 | 1 |
| 35 | 28.8 | 2.99 | 7.3 | 1 | 1 | 1 |
| 36 | 27.6 | 2.77 | 8.1 | 1 | 1 | 1 |
| 37 | 27.1 | 2.87 | 7.8 | 1 | 1 | 1 |
| 38 | 22.7 | 2.91 | 7.4 | 1 | 1 | 1 |
| 39 | 27.6 | 2.97 | 7.6 | 1 | 1 | 1 |
| 40 | 22.5 | 2.95 | 7.5 | 2 | 1 | 1 |
| 41 | 30.6 | 3.30 | 7.6 | 1 | 1 | 1 |
| 42 | 29.0 | 3.10 | 8.4 | 1 | 1 | 1 |
| 43 | 28.8 | 3.00 | 8.7 | 1 | 1 | 1 |
| 44 | 27.1 | 3.40 | 7.7 | 1 | 1 | 1 |
| 45 | 29.0 | 3.00 | 8.2 | 1 | 1 | 1 |
| 46 | 29.9 | 3.50 | 8.1 | 1 | 1 | 1 |
| 47 | 42.8 | 3.40 | 7.5 | 1 | 1 | 1 |
| 48 | 42.1 | 3.10 | 6.5 | 1 | 2 | 1 |
| 49 | 42.5 | 3.30 | 7.4 | 2 | 1 | 1 |
| 50 | 41.5 | 3.20 | 7.2 | 2 | 1 | 1 |
| 51 | 23.2 | 2.53 | 7.4 | 1 | 1 | 1 |
| 52 | 28.5 | 2.96 | 7.5 | 2 | 1 | 1 |

TABLE 3-continued

| Prep. No. | Surface tension [mN/m] | Viscosity [mm²/s] | pH | Start of print rating | Sustained use rating | Drying behavior rating |
|---|---|---|---|---|---|---|
| 53 | 27.7 | 2.68 | 8.0 | 2 | 1 | 1 |
| 54 | 27.3 | 2.65 | 7.9 | 1 | 1 | 1 |
| 55 | 22.3 | 2.79 | 7.3 | 1 | 2 | 1 |
| 56 | 27.3 | 2.89 | 7.8 | 1 | 1 | 1 |
| 57 | 22.8 | 2.91 | 7.3 | 1 | 1 | 2 |
| 72 | 29.2 | 3.93 | 8.4 | 1 | 1 | |
| 73 | 32.6 | 4.21 | 8.3 | 1 | 1 | |
| 74 | 31.6 | 4.23 | 8.2 | 1 | 1 | |
| 75 | 26.6 | 2.08 | 8.1 | 1 | 1 | |
| 76 | 26.5 | 2.17 | 8.3 | 2 | 1 | |
| 77 | 26.3 | 2.29 | 8.3 | 2 | 1 | |
| 78 | 26.6 | 2.30 | 8.0 | 3 | 1 | |
| 79 | 26.5 | 2.49 | 8.1 | 2 | 1 | |
| 80 | 26.8 | 1.84 | 8.2 | 1 | 1 | |

We claim:

1. Ink-jet inks comprising
   A) at least one dispersed (A1) or dissolved (A2) colorant,
   B) a dispersant in the case of a colorant (A1),
   C) a low molecular weight polytetrahydrofuran (C1), if desired in mixture with one of more high-boiling water-soluble or -miscible organic solvents (C2), and
   D) water
as essential constituents.

2. Ink-jet inks as claimed in claim 1, including, in each case based on the weight of the preparation,
   from 0.01 to 20% by weight of said component (A),
   from 0.01 to 20% by weight of said component (B) if the colorant is present in an essentially undissolved state,
   from 0.1 to 40% by weight of said component (C), and
   not less than 50% by weight of said component (D).

3. Ink-jets inks as claimed in claim 1, including as component (C1) one or more polytetrahydrofurans having an average molecular weight $M_W$ of from 150 to 500 g/mol.

4. Ink-jet inks as claimed in claim 1, including from 1 to 10% by weight of said component (C1) and from 1 to 30% by weight of said component (C2).

5. Ink-jet inks as claimed in claim 1, including as component (C2) one or more solvents selected from the group consisting of polyhydric alcohols, polyethylene glycols, polypropylene glycols, polyethylene glycol monoalkyl ethers, polypropylene glycol monoalkyl ethers, pyrrolidone and N-alkylpyrrolidones.

6. Ink-jet inks as claimed in claim 1, including as component (C2), in each case based on the weight of the preparation, from 1 to 10% by weight of glycerol, sorbitol and/or propylene glycol, from 1 to 10% by weight of polyethylene glycol having an average molecular weight $M_W$ of from 300 to 500 g/mol and from 1 to 10% by weight of di- and/or triethylene glycol mono-$C_1$–$C_4$-alkyl ether.

7. Ink-jet inks as claimed in claim 6, including as component (A) a finely divided organic or inorganic pigment.

8. Ink-jet inks as claimed in claim 1, including as component (B) a dispersed based on arylsulfonic acid-formaldahyde condensation products (B1), an alkoxylated phenols (B2) on condensation products of an at least disfunctional isocyanate with compounds (B3) each bearing one isocyanate-reactive group, an alkoxylated hydroxynaphthalenes (B4) or on alkoxylation products of at least difunctional aliphatic or aromatic amines having up to 8 carbon atoms (B5).

9. Ink-jets inks as claimed in claim 1, further comprising urea and a polyether allixabe alloxane copolymer.

10. Ink-jet inks as claimed in claim 1, further comprising a thermally or radiation-chemically curable binder.

11. A process for printing sheetlike or three-dimensionally configured substrates by the ink-jet process, which comprises printing colorant preparations as set forth in claim 1 onto the substrate and, if desired, subsequently fixing the print obtained.

* * * * *